United States Patent
Mohan et al.

(10) Patent No.: US 9,061,373 B2
(45) Date of Patent: Jun. 23, 2015

(54) WELDING METHOD INCLUDING CONTINUOUS WAVE WELDING AND PULSE WELDING FOR COMPONENT OF AN IMPLANTABLE MEDICAL DEVICE

(75) Inventors: Pankaj Mohan, Maple Grove, MN (US); David J. Buendorf, Maple Grove, MN (US); Jeffrey J. Louwagie, Minnetonka, MN (US)

(73) Assignee: Medtronic, Inc., Minneapolis, MN (US)

( * ) Notice: Subject to any disclaimer, the term of this patent is extended or adjusted under 35 U.S.C. 154(b) by 456 days.

(21) Appl. No.: 13/477,886

(22) Filed: May 22, 2012

(65) Prior Publication Data

US 2013/0136979 A1 May 30, 2013

Related U.S. Application Data

(60) Provisional application No. 61/565,302, filed on Nov. 30, 2011.

(51) Int. Cl.
| | |
|---|---|
| *H01M 2/08* | (2006.01) |
| *H05K 7/00* | (2006.01) |
| *B32B 1/06* | (2006.01) |
| *H05K 5/00* | (2006.01) |
| *B23K 11/00* | (2006.01) |
| *B32B 7/04* | (2006.01) |
| *B23K 26/20* | (2014.01) |
| *A61N 1/375* | (2006.01) |
| *B23K 26/06* | (2014.01) |

(52) U.S. Cl.
CPC ....... *B23K 26/206* (2013.01); *Y10T 428/24826* (2015.01); *Y10T 428/13* (2015.01); *A61N 1/375* (2013.01); *B23K 26/0626* (2013.01)

(58) Field of Classification Search
None
See application file for complete search history.

(56) References Cited

U.S. PATENT DOCUMENTS

| | | | |
|---|---|---|---|
| 4,574,176 A | 3/1986 | Sharp | |
| 4,857,697 A | 8/1989 | Melville | |
| 7,646,794 B2 | 1/2010 | Sakurai et al. | |
| 2006/0144827 A1 | 7/2006 | Papenfuss et al. | |
| 2011/0240613 A1* | 10/2011 | Hosokawa et al. | ...... 219/121.64 |

OTHER PUBLICATIONS (PCT/US2012/064289) PCT Notification of Transmittal of the International Search Report and the Written Opinion of the International Searching Authority, Mailed Mar. 1, 2013, 9 pages.

* cited by examiner

*Primary Examiner* — Patrick Ryan
*Assistant Examiner* — Christopher Domone

(57) ABSTRACT

A component of an implantable medical device may include a first member, a second member, and a composite seam weld formed between the first member and the second member. In some examples, the composite seam weld includes a continuous wave (CW)-welded portion formed using CW welding and a pulse-welded portion formed using pulsed welding. A first end of the pulse-welded portion may partially overlap a first end of the CW-welded portion and may be offset from the first end of the CW-welded portion in a direction substantially perpendicular to a longitudinal orientation of the first end of the CW-welded portion. Techniques for forming composite seam welds are also described.

20 Claims, 10 Drawing Sheets

US 9,061,373 B2

WELDING METHOD INCLUDING CONTINUOUS WAVE WELDING AND PULSE WELDING FOR COMPONENT OF AN IMPLANTABLE MEDICAL DEVICE

This application claims the benefit of U.S. Provisional Patent Application No. 61/565,302, filed Nov. 30, 2011, the entire content of which is incorporated by reference herein.

TECHNICAL FIELD

The disclosure relates to methods of welding for components of implantable medical devices.

BACKGROUND

Laser welding may be used to produce welds for items such as medical devices and related components, such as pacemakers, implantable defibrillators, batteries and hybrid circuit packages. In some examples, laser welding may provide hermetic seals for implantable medical device (IMD) enclosures and associated internal components for IMDs such as batteries and capacitors.

SUMMARY

In general, the disclosure is directed to components of implantable medical devices that include a composite seam weld between a first member of the component and a second member of the component. The disclosure also describes methods for producing a composite seam weld. As used herein, a composite seam weld may include a first seam weld portion formed using continuous wave (CW) welding and a second seam weld portion formed using pulse welding.

In one aspect, the disclosure is directed to a method that includes CW welding a first member of a component of an implantable medical device to a second member of the component to form a CW-welded portion and pulse welding the first member to the second member to form a pulse-welded portion that partially overlaps the CW-welded portion. In accordance with this aspect of the disclosure, the pulse-welded portion comprises a plurality of pulse welds and the pulse-welded portion is formed closer to a thermally sensitive module located within the component than the CW-welded portion. Additionally, pulse welding may comprise delivering a first pulse of energy to form a first pulse weld of the plurality of pulse welds that partially overlaps the CW-welded portion and is offset from the CW-welded portion in a direction substantially perpendicular to a longitudinal orientation of the CW-welded portion at a location at which the first pulse of energy is delivered.

In another aspect, the disclosure is directed to a battery for an IMD, the battery comprising a first member, a second member, a separator material disposed within a cavity defined by the first member and the second member, and a composite seam weld formed between the first member and the second member. According to this aspect of the disclosure, the composite seam weld includes a CW-welded portion formed using CW welding and a pulse-welded portion formed using pulsed welding. Further, the pulse-welded portion is formed closer to the thermally sensitive module than the CW-welded portion, and a first end of the pulse-welded portion partially overlaps a first end of the CW-welded portion and is offset from the first end of the CW-welded portion in a direction substantially perpendicular to a longitudinal orientation of the first end of the CW-welded portion.

In an additional aspect, the disclosure is directed to a component for an IMD, the component comprising a first member, a second member, and a composite seam weld formed between the first member and the second member. In accordance with this aspect of the disclosure, the composite seam weld includes a CW-welded portion formed using CW welding and a pulse-welded portion formed using pulsed welding. Additionally, a first end of the pulse-welded portion partially overlaps a first end of the CW-welded portion and is offset from the first end of the CW-welded portion in a direction substantially perpendicular to a longitudinal orientation of the first end of the CW-welded portion.

The details of one or more examples of the disclosure are set forth in the accompanying drawings and the description below. Other features, objects, and advantages of the disclosure will be apparent from the description and drawings, and from the claims.

DETAILED DESCRIPTION

In general, the disclosure is directed to components of IMDs that include a composite seam weld between a first member of the component and a second member of the component, e.g., to mechanically couple the first member and the second member via the composite seem weld. The disclosure also describes methods for producing a composite seam weld. As used herein, a composite seam weld may include a first seam weld portion formed using continuous wave welding and a second seam weld portion formed using pulse welding.

Figure 1:
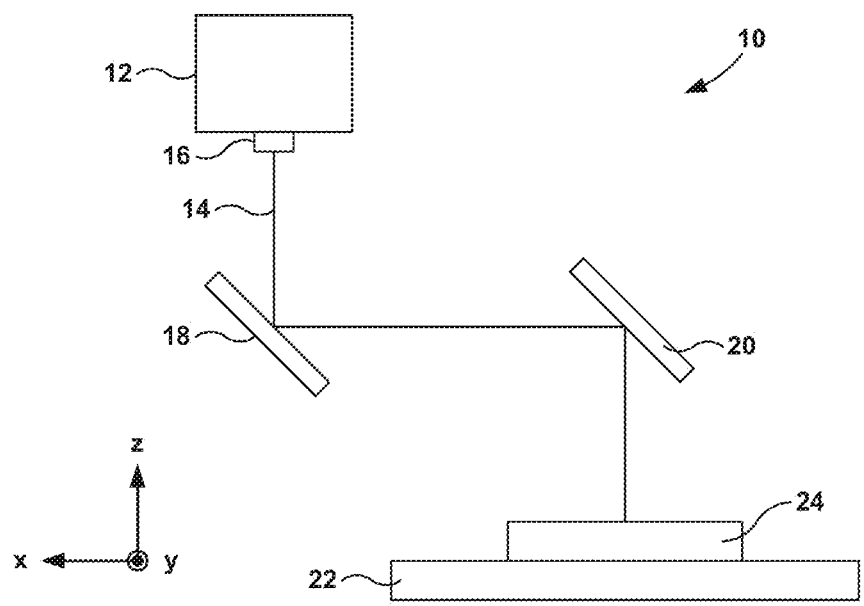
FIG. 1 is a conceptual diagram that illustrates an example of a welding system that may be used to form a composite seam weld in accordance with aspects of this disclosure.

FIG. 1 is a conceptual diagram that illustrates an example of a welding system 10 that may be to form a composite seam weld in accordance with aspects of this disclosure. In the example illustrated in FIG. 1, welding system 10 includes an energy source 12, a lens 16, a first mirror 18, a second mirror 20, and a stage 22. Energy source 12 emits a beam 14 of energy.

Disposed on stage 22 is a component 24. In some examples, component 24 is a component of an IMD. For example, component 24 may be a housing of an IMD, a housing of a battery, a housing of a capacitor, or a package of an integrated or hybrid circuit.

Figures 2A, 2B:
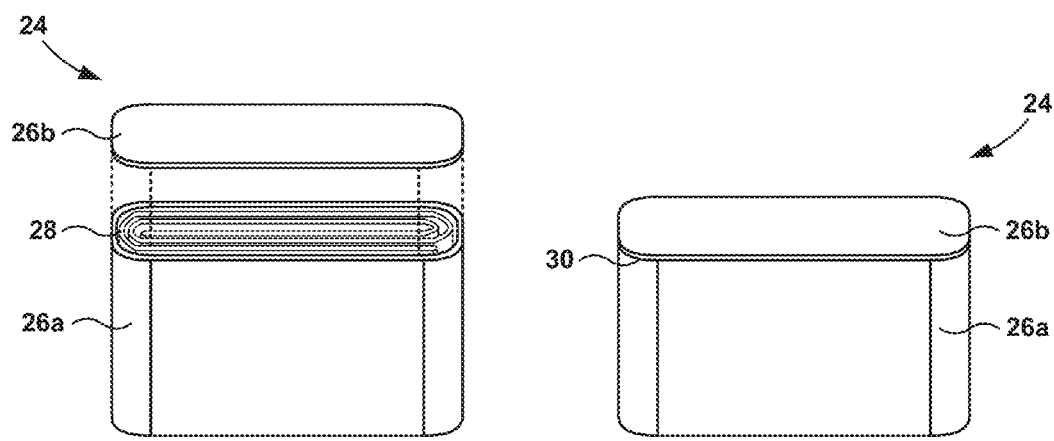
FIGS. 2A and 2B are conceptual diagrams that illustrate an example of a component that may be welded in accordance with aspects of this disclosure.

FIGS. 2A and 2B are conceptual diagrams that illustrate an example of component 24. In the example illustrated in FIGS. 2A and 2B, component 24 is a battery housing, and includes a first member 26a (a battery case) and a second member 26b (a battery cover) (collectively, "members 26"). FIG. 2A illustrates first member 26a and second member 26b separated and illustrates separator material 28 disposed (or located) within component 24 (e.g., within a cavity defined by first member 26a and second member 26b). FIG. 2B illustrates first member 26a assembled with second member 26b and illustrates a seam weld 30.

System 10 may be used to weld first member 26a to second member 26b to mechanically couple the members 26. In particular, system 10 may be used to form a seam weld 30 to mechanically couple first member 26a and second member 26b. In some examples, first member 26a and/or second member 26b may be formed of a metal or metal alloy. The metal or metal alloy may or may not be biocompatible. For example, the metal or metal alloy may include titanium, a titanium alloy, aluminum, stainless steel, or the like.

Component 24 may enclose a thermally sensitive module. For example, component 24 may enclose a separator material 28 that surrounds an anode coil of a battery (e.g., when component 24 is a battery housing). Separator material 28 may include a material that may be damaged by high temperatures, such as polypropylene. Types of damage to separator material may include melting, perforation (holes), or transparency (e.g., due to thinning of separator material 28). In other examples, the thermally sensitive module within component 24 may include a hybrid circuit or a polymer material that may be damaged by high temperatures.

Returning to FIG. 1, system 10 also includes stage 22, on which component 24 is disposed during welding. In some examples, stage 22 may be movable in at least one direction (e.g., at least one of the x-axis, y-axis, or z-axis shown in FIG. 1) to translate and/or rotate component 24 relative to beam 14. In some examples, beam 14 may be stationary, and stage 22 may be movable relative to beam 14 to move component 24 relative to beam 14. In other examples, beam 14 may be movable in at least one direction and stage 22 also may be movable in at least one direction. In such examples, movement of beam 14 relative to component 24 may be accomplished by a combination of movement of stage 22 and beam 14. In other examples, stage 22 may be stationary and beam 14 may be moveable, such that substantially all relative movement between component 24 and beam 14 is accomplished by movement of beam 14.

System 10 also includes energy source 12, which emits beam 14. Energy source 12 may include, for example, a laser source, such as a carbon dioxide ($CO_2$) or Nd:YAG (neodymium-doped yttrium aluminum garnet) laser source. Beam 14 may provide the energy necessary to weld first member 26a of component 24 to second member 26b of component 24 along seam weld 30 (FIG. 2B). Seam weld 30 is located at a position where first member 26a contacts second member 26b.

System 10 may include at least one optical component that directs beam 14 to component 24. For example, system 10 may include lens 16, first mirror 18, and second mirror 20, which are positioned to directed beam 14 to component 24. In some examples, system 10 may include other traditional optical components (e.g., lenses, collimators, or the like) and/or a fiber-optic beam delivery (FOBD) system. An FOBD system uses an optical cable to deliver beam 14 to the workstation, enabling energy source 12 to be located remotely from component 22 during welding, if desired. FOBD systems may be configured to permit the output of one laser source to supply the laser energy to be used at several workstations in different locations.

In some examples, first mirror 18 and/or second mirror 20 may be attached to a linear motor and/or a galvanometer. In a galvanometer system (or "galvo system") a position of mirrors 18, 20 is adjusted, typically using a system of motors under computer control, to change the angle of mirrors 18, 20, and hence, the position of the focal point of beam 14 on component 24. In some examples, first mirror 18 may be configured to control a position of beam 14 along a first axis (e.g., the x-axis in FIG. 1) and second mirror 20 may be configured to control a position of beam 14 along a second axis (e.g., the y-axis in FIG. 1). In some examples, the first and second axes may be substantially perpendicular.

During welding, beam 14 heats portions of first member 26a and/or second member 26b to a molten state. Upon cooling, the molten portions solidify, resulting in mechanical coupling between first member 26a and second member 26b. Because welding requires heating the portions of first member 26a and/or second member 26b to relatively high temperatures, welding also may result in heating adjacent components, e.g., as heat conducts or dissipates from the heated portions to adjacent areas.

In some examples, a configuration of other components relative to component 24 may result in heating of a thermally sensitive component or material near seam weld 30. For example, as shown in FIG. 2, component 24 may house an anode coil enclosed within a separator material 28. In some cases, separator material 28 is disposed within component 24 near a weld path along which first member 24a is welded to second member 24b.

In accordance with aspects of this disclosure, system 10 may be configurable to operate in a continuous wave ("CW") mode and a pulsed mode. When configured in the CW mode, energy source 12 may emit a beam 14 that is substantially continuous (e.g., in time) and is directed to component 24 by lens 16, first mirror 18, and second mirror 20. Although CW mode may facilitate relatively quick welding of first member 26a to second member 26b, CW mode may result in high temperatures of first member 26a and/or second member 26b adjacent seam weld 30. In some examples, the temperatures may be sufficiently high to heat adjacent portions of component 24 or modules located within component 24 near seam weld 30, such as separator material 28. When the module or modules located within component 24 near seam weld 28 are heated, the resulting temperatures may damage the module or modules, e.g., portions of separator material 28.

Energy source 12 may be configured in pulsed mode to deliver a beam 14 that is pulsed in time. In some examples, energy source 12 may be configured in pulsed mode when beam 14 is directed by lens 16, first mirror 18, and second mirror 20 toward a location along seam weld 30 near thermally sensitive modules (e.g., separator material 28) located within component 24.

In pulsed mode, energy source 12 may deliver a beam 14 that is pulsed on and off (i.e., is discontinuous in time). For example, when configured in the pulsed mode, energy source 12 may deliver beam 14 for an amount of time, stop delivering beam 14 for a subsequent amount of time, and subsequently deliver beam 14 for another amount of time. This may repeat such that energy source 12 delivers beam 14 in a train of pulses. In some examples, beam 14 is moved between each pulse, e.g., using lens 16, first mirror, 18, and second mirror 20, such that the sequential pulses define a substantially continuous seam weld.

In accordance with aspects of this disclosure, energy source 12 may be configured to operate in pulsed mode when welding a portion of seam weld 30 adjacent (or near) a thermally sensitive component, such as separator material 28. In some examples, when operated in pulsed mode, energy source 12 may deliver the necessary power to form a seam weld on component 24, while maintaining relatively low heat input to component 24. Pulsed welding employs a relatively high peak pulse energy to provide adequate weld penetration, while the intermittent nature of the pulsed energy results in a low average power delivered, which tends to reduce the total heat input to component 24 by beam 14. In some examples, this may also reduce heat transferred to modules within component 24 located near seam weld 30, such as separator material 28. In this way, pulsed welding may in some cases reduce or eliminate damage to thermally sensitive modules located near seam weld 30.

In pulse welding, some applications, such as hermetic seam welds, may utilize overlapped pulses to form the hermetic seam weld. The amount of overlap between successive pulses may be defined based on the surface area of each weld point (i.e., each individual weld formed by a single pulse). Alternatively, the amount of overlap between successive pulses may be defined as a fraction or decimal of the radius of the weld point. For example, successive pulses may overlap between about 75% and about 80% of the radius of the weld point or the surface area of the weld point to ensure a hermetic seam weld is formed and no voids are formed between successive pulse welds.

The overlap between successive pulse welds may limit how quickly successive pulses may be delivered without heating component 22 or other modules near weld seam 28 to unacceptable temperatures. Because of this, the amount of time required to complete a hermetic seal weld may be lengthened by the successive spot overlap and thermal constraints imposed by the presence of thermally sensitive modules.

Additionally, the pulse rate at which pulses of energy are successively delivered may be relatively low to reduce the average power delivered and reduce the total heat input to component 24. For example, the pulse rate at which pulses of energy are successively delivered may be less than about 10 Hz (10 laser pulses per second). Because of this relatively low pulse rate and the overlap between adjacent pulses used to form hermetic seam welds, pulsed welding may take longer to form a given length of seam weld 30 compared to CW welding. For example, for a laser spot size of about 0.635 millimeters (mm; about 0.025 inches) in diameter and an overlap of approximate 80% may result in a weld time of more than 100 seconds to complete a 127 mm (about 5 inch) long seam weld.

Hence, according to aspects of this disclosure, system 10 may be operated in pulsed mode when beam 14 is forming seam weld 30 near thermally sensitive modules, such as separator material 28, and in CW mode when beam 14 is forming seam weld 30 at locations further from thermally sensitive modules, such as separator material 28. In this way, total welding time for forming seam weld 30 may be reduced compared to forming all of seam weld 30 using pulsed welding. Additionally, the techniques described herein may reduce or substantially eliminate damage to thermally sensitive modules, such as separator material 28, located near seam weld 30 caused by high temperatures due to the welding process.

Figure 3:
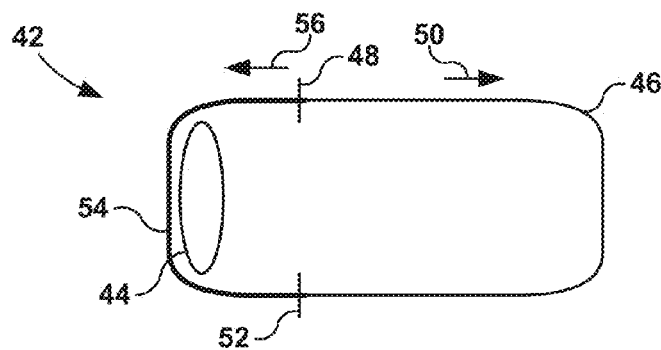
FIG. 3 is a conceptual diagram that illustrates an example of a composite seam weld and a thermally sensitive module.

FIG. 3 is a conceptual diagram that illustrates a composite seam weld 42 and a thermally sensitive module 44. Although component 24, first member 26a, and second member 26b shown in FIGS. 2A and 2B are not shown in FIG. 3 for sake of clarity, composite seam weld 42 may be formed between first member 26a and second member 26b. Composite seam weld 42 includes a first portion 46 formed using CW welding (also referred to herein as "CW-welded portion 46") and a second portion 54 formed using pulsed welding (also referred to herein as "pulse-welded portion 54"). Thermally sensitive module 44 may be located further from CW-welded portion 46 of composite seam weld 42 than pulse-welded portion 54 of composite seam weld 42 (equivalently, thermally sensitive module 44 may be located nearer to or adjacent to pulse-welded portion 54 and further from CW-welded portion 46). As described above, thermally sensitive module 44 may be, for example, a separator material 28 (FIG. 2A) for a battery or an integrated or hybrid circuit.

In examples in which thermally sensitive module 44 is a separator material, such as separator material 28, the separator material may substantially enclose an anode coil of a battery. As the anode coil is coiled, separator material 28 may be longer in some areas than other areas, and thus may be closer to composite seam weld 42 in some areas compared to other areas. The reduced distance between the separator material 28 and composite seam weld 42 may lead to an increased risk of thermal damage to separator material 28 at locations where separator material 28 is closer to seam weld 42 compared to locations at which separator material 28 is further from seam weld 42. In the example illustrated in FIG. 3, the location at which separator material 28 may be closer to composite weld seam 42 is represented conceptually by thermally sensitive module 44.

CW-welded portion 46 of composite seam weld 42 may begin at the position marked by line 48 and proceed in the direction indicated by arrow 50. CW-welded portion 46 may end at the position marked by line 52. In other examples, CW-welded portion 46 may begin at the position marked by line 52 and end at the position marked by line 48 (proceeding in the direction substantially opposite to arrow 50).

In some examples, as illustrated in FIG. 3, the beginning and end of first portion 46 (represented by lines 28 and 52, respectively) may be located at a distance from thermally sensitive module 44. For example, the beginning and end of first portion 46 may be located at least about 0.05 inches (about 1.27 millimeters), such as between about 0.05 inches (about 1.27 millimeters) and about 0.25 inches (about 6.35 millimeters) from thermally sensitive module 44. In some examples, this may reduce a risk of thermal damage to thermally sensitive module 44 from the CW-welding process. For example, at the beginning or end of the CW-welded portion 46, the energy beam (e.g., beam 14 of FIG. 1) may remain substantially stationary or move at a slower rate than during a middle section of CW-welded portion 46. This may result in more energy being delivered to the area of the component near the beginning and/or end of CW-welded portion 46, which may cause higher temperatures near the beginning and/or end of CW-welded portion 46. In some examples, this may increase a risk of a hole or void being formed through the material being welded, which may allow the energy beam to be directed to a component or module (e.g., separator material 28) within the component being welded (e.g., component 24 shown in FIGS. 1 and 2). By beginning and ending CW-welded portion 46 some distance from thermally sensitive module 44, the risk of thermally sensitive module 44 being damaged by high temperatures caused by CW welding or direct exposure to the energy beam may be reduced.

Composite seam weld 42 also includes pulse-welded portion 54. Pulse-welded portion 54 is formed closer to thermally sensitive module 44 than is CW-welded portion 46. Pulse-welded portion 54 begins and ends near the beginning and ending locations of CW-welded portion 46, as illustrated by lines 48 and 52. In particular, a portion of pulse-welded portion 54 partially overlaps a portion of CW-welded portion 46 so composite seam weld 42 is substantially continuous. For example, a first end of pulse-welded portion 54 overlaps a first end of CW-welded portion 46 at the location indicated by line 48. Similarly, a second end of pulse-welded portion 54 overlaps a second end of CW-welded portion 46 at the location indicated by line 52. In this way, composite seam weld 42 may form a substantially hermetic mechanical connection (e.g., a hermetic seal) between the first member and the second member of the component being welded (e.g., between first member 26a and second member 26b of component 24 shown in FIGS. 2A and 2B).

In some implementations, CW-welded portion 46 may be formed before pulse-welded portion 54. Then, pulse-welded portion 54 may be formed such that a section of pulse-welded portion 54 overlaps a section of CW-welded portion 46. In other implementations, pulse-welded portion 54 may be formed before CW-welded portion 46 and CW-welded portion 46 may be formed such that a section of CW-welded portion 46 overlaps a section of pulse-welded portion 54.

Figure 4:
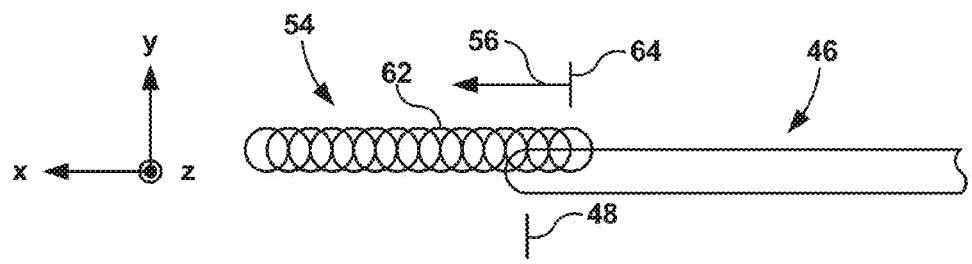
FIG. 4 is a conceptual diagram that shows an example by which a pulse-welded portion of a composite seam weld may partially overlap a CW-welded portion of the composite seam weld.

FIG. 4 is a conceptual diagram that shows an example by which pulse-welded portion 54 may partially overlap CW-welded portion 46. As shown in FIG. 4, CW-welded portion 46 ends at the location indicated by line 48. CW-welded portion 46 forms a substantially continuous seam weld, e.g., includes substantially no voids extending between an interior and an exterior of the component being welded (e.g., component 24).

Pulse-welded portion 54 is formed by a plurality of pulse welds 62. Pulse welds 62 are each formed by a single pulse of energy from the pulsed energy beam. Pulse-welded portion 54 is formed by delivering pulses of energy beginning at the position indicated by line 64 and continuing in the direction indicated by arrow 56. The position indicated by line 64 is disposed relative to the position indicated by line 48 so that some pulse welds 62 partially overlap CW-welded portion 46.

As shown in FIG. 4, each of pulse welds 62 overlaps adjacent ones of pulse welds 62. By overlapping adjacent pulse welds 62, a pulse-welded portion 54 of a seam weld may be formed that is substantially continuous. In some examples, pulse-welded portion 54 and CW-welded portion 46 together form a hermetic seam weld. As described above, discrete welds 62 may overlap adjacent pulse welds 62 by an amount defined with respect to a radium of a respective one of pulse welds 62 or a surface area of a respective one of discrete welds 62. In some examples, successive pulses may overlap between about 75% and about 80% of the radius of one of pulse welds 62 the surface area of one of pulse welds 62 to ensure a hermetic seam weld is formed and no voids are formed between successive pulse welds 62.

Some pulse welds 62 partially overlap CW-welded portion 46. As shown in FIG. 4, portions of the first four of pulse welds 62 partially overlap CW-welded portion 46, although in other examples, more or fewer pulse welds 62 may overlap CW-welded portion 46. Overlap between pulse weds 62 formed at the beginning (and/or end) of pulse-welded portion 54 and an end (and/or beginning) of CW-welded portion 46 may contribute to formation of a composite seam weld 42 that is hermetic.

Additionally, pulse-welded portion 54 is offset from CW-welded portion 46. As illustrated in FIG. 4, CW-welded portion 46 and pulse-welded portion 54 extended along a longitudinal orientation substantially in an x-axis direction (as indicated by substantially orthogonal x-, y-, and z-axes in FIG. 4). Pulse-welded portion 54 is offset from CW-welded portion 46 in the y-axis direction (e.g., a direction substantially perpendicular to the longitudinal orientation of CW-welded portion 46).

Pulse-welded portion 54 may be offset from CW-welded portion 46 so that some pulse welds 62 partially (but not fully) overlap CW-welded portion 46. As described above, overlap between some of pulse welds 62 and CW-welded portion 46 may contribute to hermeticity of composite seam weld 42. Additionally, overlap between some of pulse welds 62 and CW-welded portion 46 may facilitate formation of the initial pulse welds 62. In some examples, formation of a pulse weld may be more difficult when the pulse weld does not overlap a previously formed weld (e.g., another pulse weld or a continuous weld). Thus, if pulsed welding is performed first (before CW welding) or if no pulse welds 62 partially overlap CW-welded portion 46, formation of the initial ones of pulse welds 62 may be more difficult. For example, formation of initial ones of pulse welds 62 (when not formed to overlap with a previously formed weld) may require a longer pulse width or a higher power of the energy beam to result in formation of a weld. As another example, attempts at forming initial ones of pulse welds 62 (when not formed to overlap with a previously formed weld) may be more likely to result in formation of a hole or void compared to forming the initial pulse welds 62 partially overlapped with a previously formed weld (e.g., a previously formed one of pulse welds 62 or a section of CW-welded portion 54).

Conversely, if one or more of pulse welds 62 fully overlaps CW-welded portion 46, there may be a greater risk of forming a hole in the component being welded (e.g., component 24 of FIGS. 1, 2A, and 2B) compared to when pulse welds 62 only partially overlap CW-welded portion 46. Thus, forming pulse welds 62 at an offset from CW-welded portion 46 at positions where pulse welds 62 overlap CW-welded portion 46 may reduce a risk of forming a hole in the component being welded (e.g., component 24 of FIGS. 1, 2A, and 2B) while facilitating formation of pulse welds 62. Overlap between CW-welded portion 46 and pulse-welded portion 54 thus may reduce a risk of forming a seam weld 42 that is not hermetic, and also may reduce a risk of damaging a module or component (e.g., separator material 28 of FIG. 2A) within the component being welded (e.g., component 24 of FIGS. 1, 2A, and 2B) due to exposure of the module or component to the energy beam.

The amount of overlap between CW-welded portion 46 and pulse-welded portion 54 (measured in the direction of the y-axis shown in FIG. 4) may be defined based on a fraction or decimal of the width (measured in the direction of the y-axis)

of the pulse-welded portion 54. For example, pulse-welded portion 54 may overlap CW-welded portion 46 (in the direction of the y-axis of FIG. 4) greater than about 50% of the width of the pulse-welded portion 54 and less than 100% of the width of pulse-welded portion 54. In other examples, pulse-welded portion 54 may overlap CW-welded portion 46 (in the direction of the y-axis of FIG. 4) greater than about 50% or less than about 90%, or greater than about 90% and less than 100%.

Figure 5:
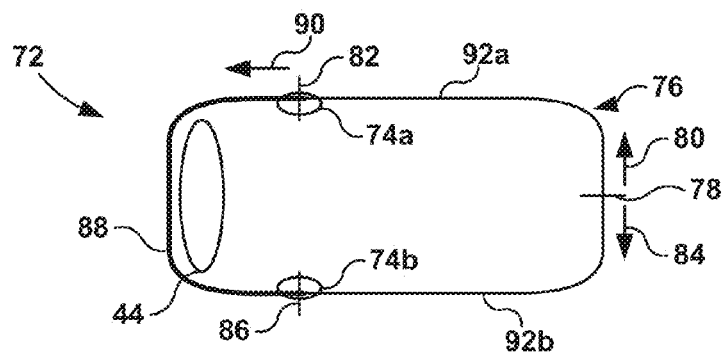
FIG. 5 is a conceptual diagram of another example composite seam weld that includes a CW-welded portion and a pulse-welded portion.

Although FIG. 3 illustrates one example of a composite seam weld 42 and example configurations of CW-welded portion 46 and pulse-welded portion 54, other example composite seam welds and configurations of CW-welded portions and pulse-welded portions are contemplated. FIG. 5 is a conceptual diagram of another example composite seam weld 72. Composite seam weld 72 includes a CW-welded portion 76 and a pulse-welded portion 88. In the example illustrated in FIG. 5, CW-welded portion 76 includes a first section 92a and a second section 92b. Additionally, FIG. 5 conceptually illustrates thermally sensitive module 44, first protective insulation 74a, and second protective insulation 74b (collectively, "protective insulation 74"). In some examples, protective insulation 74 also may be provided near the position indicated by line 78.

Protective insulation 74 may be positioned near (e.g., adjacent to) the locations at which first section 92a and second section 92b of CW-welded portion 76 end, indicated by lines 82 and 86, respectively. Because pulse-welded portion 88 partially overlaps ends of first section 92a and second section 92b, protective insulation 74 also may be located near a beginning and end of pulse-welded portion 88. Although not shown in FIG. 3, protective insulation 74 may be disposed within a cavity formed by the first member and second member that are being welded (e.g., first member 26a and second member 26b shown in FIGS. 2A and 2B). Additionally, in some examples, protective insulation 74 may be located between CW-welded portion 76 and thermally sensitive module 44. Moreover, although not shown in FIG. 5, protective insulation 74 may be positioned or disposed near a beginning of first section 92a and second section 92b, as indicated by line 88.

Protective insulation 74 may provide thermal insulation between composite seam weld 72 and modules or components (e.g., separator material 28 of FIG. 2A) disposed within the component being welded (e.g., component 24 of FIGS. 1, 2A, and 2B) during formation of composite seam weld 72. In some examples, when forming first section 92a and second section 92b, when the energy beam (e.g., beam 14 of FIG. 1) reaches the end of first section 92a and/or second section 92b, the energy beam may slow its translational movement along the weld path. The slowing of the translational movement of the beam may result in greater amounts of energy being introduced into the component being welded (e.g., component 24 of FIGS. 1, 2A, and 2B) at these locations compared to locations where the translational movement of the beam is greater. Accordingly, protective insulation 74 may be provided near these positions at which the beam moves slower to provide further thermal protection to components or modules (e.g., separator material 28 of FIG. 2A) disposed within the component being welded (e.g., component 24 of FIGS. 1, 2A, and 2B). Protective insulation 74 may include any thermally insulative material, such as a polymer. In an example, protective insulation 74 includes polytetrafluoroethylene (PTFE).

CW-welded portion 76 includes first section 92a and second section 92b. Formation of first section 92a begins at the position indicated by line 78 and continues in the direction indicated by arrow 80 to the end of first section 92a, indicated by line 82. Formation of second section 92b begins at the position indicated by line 78 and continues in the direction indicated by arrow 84 to the end of second section 92b, indicated by line 86. First section 92a may at least partially overlap second section 92b at the location indicated by 78, so that first section 92a and second section 92b form a substantially continuous CW-welded portion 76 of composite seam weld 72.

In some examples, beginning first section 92a and second section 92b at a location away from thermally sensitive module 44 (e.g., substantially opposite thermally sensitive component 44 as illustrated in FIG. 5) may reduce a risk of damage to thermally sensitive component 44 compared to beginning CW-welded portion 76 nearer to thermally sensitive component 44 (e.g., as illustrated in FIG. 3). For example, when beginning to form first section 92a and/or second section 92b, the energy beam used to form the weld may be moving along the weld path relatively slowly. The relatively slow movement of the beam may result in greater amounts of energy being introduced into the component being welded (e.g., component 24 of FIGS. 1, 2A, and 2B) at these starting location compared to locations where the translational movement of the beam is greater. Accordingly, locating portions exposed to greater heat (and thus, higher temperatures) away from thermally sensitive module 44 may reduce a risk of damage to thermally sensitive module 44.

Composite seam weld 72 also includes pulse-welded portion 88. As illustrated in FIG. 5, formation of pulse-welded portion 88 begins near the position indicated by line 82, proceeds in the direction indicated by arrow 90, and ends near the position indicated by line 86. Alternatively, formation of pulse-welded portion 88 may begin near the position indicated by line 86, proceeds in the direction opposite of arrow 90, and end near the position indicated by line 82. As described above with respect to FIGS. 3 and 4, pulse-welded portion 88 may be formed from a plurality of sequential pulse welds. Some pulse welds may overlap an end of first section 92a near the location indicated by line 82. Some pulse welds may partially overlap an end of second section 92a near the location indicated by line 86. As described with respect to FIG. 4, the pulse welds that overlap first section 92a and second section 92b, respectively, may be offset from first section 92a and second section 92b.

Figure 6A:
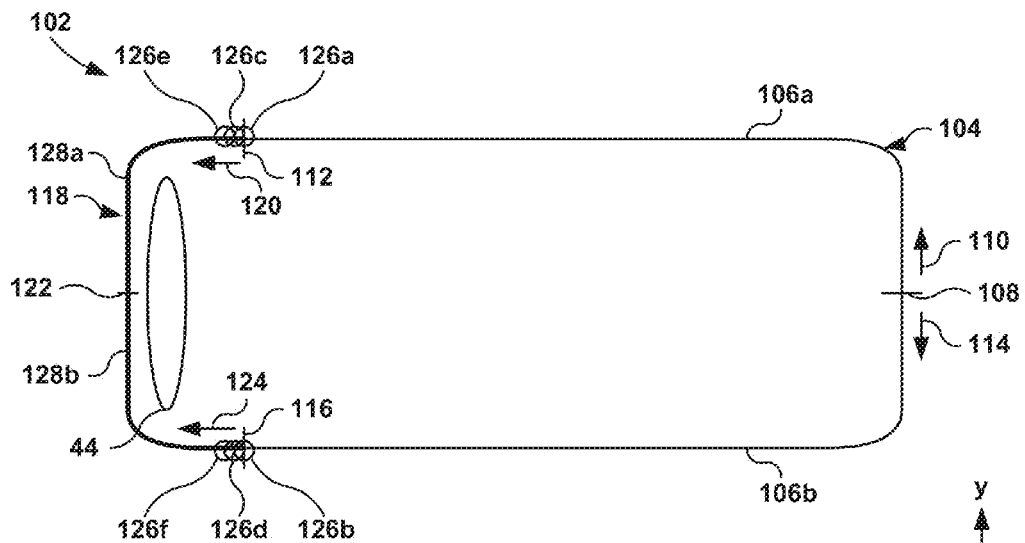
FIGS. 6A and 6B are conceptual diagrams that illustrate an example of a composite seam weld that includes a CW-welded portion and a pulse-welded portion divided into two sections.
Figure 6B:
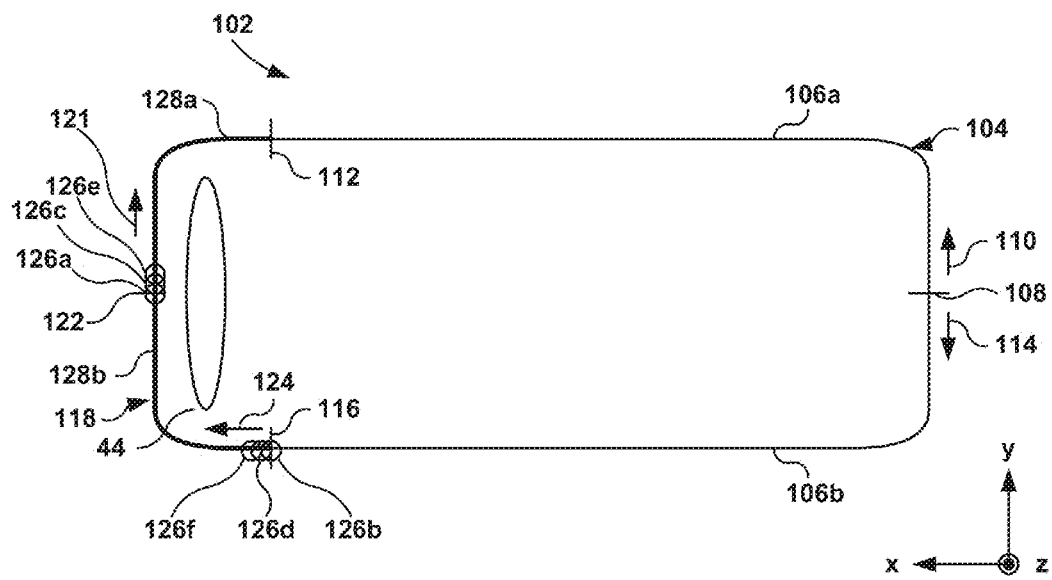

FIGS. 6A and 6B are conceptual diagrams that illustrate other examples of composite seam welds and techniques for forming composite seam welds. The technique of forming the composite seam welds in FIGS. 6A and 6B will be described with concurrent reference to system 10 of FIG. 1. In the example illustrated in FIG. 6A, composite seam weld 102 includes CW-welded portion 104 and pulse-welded portion 118. Similar to CW-welded portion 76 of FIG. 5, CW-welded portion 104 includes a first section 106a and a second section 106b. First section 106a of CW-welded portion 104 may be formed by configuring system 10 is CW mode and directing beam 14 to position 108, e.g., by controlling lens 16, first mirror 18, and/or second mirror 20. System 10 then may be controlled to translate beam 14 along the weld path in the direction indicated by arrow 110 to position 112, such that first section 106a is formed. Second section 106b of CW-welded portion 104 may be formed by configuring system 10 is CW mode and directing beam 14 to position 108, e.g., by controlling lens 16, first mirror 18, and/or second mirror 20. System 10 then may be controlled to translate beam 14 along the weld path in the direction indicated by arrow 114 to position 116, such that second section 106b is formed. First section 106a may at least partially overlap second section 106b at the location indicated by 108, so that first section 106a and second section 106b form a substantially continuous CW-welded portion 104 of composite seam weld 102.

Pulse-welded portion 118 is formed from a plurality of pulse welds 126a, 126b, 126c, 126d, 126e, 126f (collectively, "pulse welds 126"). Pulse welds 126 may be formed sequentially (e.g., one at a time) or two or more pulse welds 126 may be formed substantially simultaneously.

In some examples, respective ones of pulse welds 126 may be formed sequentially such that third pulse weld 126c is formed immediately following formation of first pulse weld 126a (e.g., no other pulse welds 126 are formed during the time between forming first pulse weld 126a and forming third pulse weld 126c) and fifth pulse weld 126e is formed immediately following formation of third pulse weld 126c. In examples such as these, pulse welds 126 may be formed in sequentially overlapping order from location 112 to location 122, forming a substantially continuous first section 128a of pulse-welded portion 118. To accomplish formation of pulse welds 126 in such order, beam 14 may be positioned at the location of first pulse weld 126a using lens 16, first mirror 18, and second mirror 20 and energy source 12 may deliver a first pulse of energy sufficient to form first pulse weld 126a. Beam 14 then may be positioned at the location of third pulse weld 126b using lens 16, first mirror 18, and second mirror 20 and energy source 12 may deliver a second pulse of energy sufficient to form third pulse weld 126c. The repositioning of beam 14 and delivery of pulses of energy by energy source 12 may continue until first section 128a of pulse-welded portion 118 is completed.

Similarly, fourth pulse weld 126d may be formed immediately following formation of second pulse weld 126b (e.g., no other pulse welds 126 are formed during the time between forming second pulse weld 126b and forming fourth pulse weld 126d) and sixth pulse weld 126e may be formed immediately following formation of fourth pulse weld 126d. In examples such as these, pulse welds 126 may be formed in sequentially overlapping order from location 116 to location 122, forming a substantially continuous second section 128b of pulse-welded portion 118. To accomplish formation of pulse welds 126 in such order, beam 14 may be positioned at the location of second pulse weld 126b using lens 16, first mirror 18, and second mirror 20 and energy source 12 may deliver a first pulse of energy sufficient to form second pulse weld 126b. Beam 14 then may be positioned at the location of fourth pulse weld 126d using lens 16, first mirror 18, and second mirror 20 and energy source 12 may deliver a second pulse of energy sufficient to form fourth pulse weld 126d. The repositioning of beam 14 and delivery of pulses of energy by energy source 12 may continue until second section 128b of pulse-welded portion 118 is completed.

In such examples, a rate of formation of first section 128a and second section 128b of pulse-welded portion 118 may be limited by thermal effects of the pulse welding. As described above, the pulse rate may be limited to, e.g., 10 Hz, to prevent undue heating of thermally sensitive module 44 and/or portions of the component being welded adjacent to pulse-welded portion 118.

In some examples, instead of forming all of first section 128a then all of second section 128b (or vice versa), first section 128a and second section 128b may be formed substantially simultaneously. In some examples, two beams (e.g., two of beam 14) may be used to form pulse welds 126 of first section 128a and second section 128b substantially simultaneously. For example, system 10 may include two energy sources 12 or may include a single energy source 12 and a beam splitter that results in two beams from the single energy source 12. A first energy beam may be directed to the location of first pulse weld 126a and a second energy beam may substantially simultaneously be directed to the location of second pulse weld 126b. Pulses of energy sufficient to form first pulse weld 126a and second weld 126b then may be delivered substantially simultaneously using the first beam and second beam. The first and second beams then may be directed to locations of third pulse weld 126c and fourth pulse weld 126d, respectively, and be used to form third pulse weld 126c and fourth pulse weld 126d. This process may continue until a sufficient number of pulse welds 126 have been formed to complete first section 128a and second section 128b.

In other examples, a single beam 14 may be alternately directed to first section 128a and second section 128b. In such examples, energy beam 14 may be directed to the location at which first pulse weld 126a is to be formed using lens 16, first mirror 18, and second mirror 20. Energy source 12 then may deliver an amount of energy sufficient to form first pulse weld 126a. Energy beam 14 then may be directed to the location at which second pulse weld 126b is to be formed using lens 16, first mirror 18, and second mirror 20. Energy source 12 then may deliver an amount of energy sufficient to form second pulse weld 126b. Energy beam then may be directed to the location at which third pulse weld 126c is to be formed using lens 16, first mirror 18, and second mirror 20. Energy source 12 then may deliver an amount of energy sufficient to form third pulse weld 126c. This process may continue until first section 128a and second section 128b are completed using a sufficient number of pulse welds.

FIG. 6B illustrates an alternative technique for forming pulse welded portion 118. In the example shown in FIG. 6B, first pulse weld 126a is formed near location 122 and the formation of pulse welds proceeds in the direction indicated by arrow 121. Second pulse weld 126b is formed near location 116, as in the example illustrated in FIG. 6A. In some examples, two beams (e.g., two of beam 14) may be used to form pulse welds 126 of first section 128a and second section 128b substantially simultaneously. For example, system 10 may include two energy sources 12 or may include a single energy source 12 and a beam splitter that results in two beams from the single energy source 12. A first energy beam may be directed to the location of first pulse weld 126a and a second energy beam may substantially simultaneously be directed to the location of second pulse weld 126b. Pulses of energy sufficient to form first pulse weld 126a and second weld 126b then may be delivered substantially simultaneously using the first beam and second beam. The first and second beams then may be directed to locations of third pulse weld 126c and fourth pulse weld 126d, respectively, and be used to form third pulse weld 126c and fourth pulse weld 126d. This process may continue until a sufficient number of pulse welds 126 have been formed to complete first section 128a and second section 128b.

In other examples, a single beam 14 may be alternately directed to first section 128a and second section 128b. In such examples, energy beam 14 may be directed to the location at which first pulse weld 126a is to be formed using lens 16, first mirror 18, and second mirror 20. Energy source 12 then may deliver an amount of energy sufficient to form first pulse weld 126a. Energy beam 14 then may be directed to the location at which second pulse weld 126b is to be formed using lens 16, first mirror 18, and second mirror 20. Energy source 12 then may deliver an amount of energy sufficient to form second pulse weld 126b. Energy beam then may be directed to the location at which third pulse weld 126c is to be formed using lens 16, first mirror 18, and second mirror 20. Energy source 12 then may deliver an amount of energy sufficient to form third pulse weld 126c. This process may continue until first section 128a and second section 128b are completed using a sufficient number of pulse welds.

In some examples, the effect of forming pulse welds 126 substantially simultaneously or alternately between at least two locations is to increase the effective rate of formation of pulse-welded portion 118. For example, the pulse rate between immediately adjacent pulse welds (e.g., first pulse weld 126a and third pulse weld 126c or second pulse weld 126b and fourth pulse weld 126d) may be held constant at 10 Hz, but when pulse welding beginning at two separate locations, pulses may be effectively delivered at a rate of 20 Hz.

Alternatively, the effect of forming pulse welds 126 substantially simultaneously or alternately between at least two locations may be to decrease an amount of heat per unit time introduced to a volume of the component being welded. For example, if an effective pulse rate of 10 Hz is desired and pulse welds 126 are formed beginning at two separate locations (e.g., locations 112 and 116), the pulse rate between immediately adjacent pulses (e.g., first pulse weld 126a and third pulse weld 126c or second pulse weld 126b and fourth pulse weld 126d) may be reduced to 5 Hz, which may reduce a rate at which heat is introduced to a volume of the component being welded.

Although various examples of the disclosure have been described in various figures, features of the examples may be combined and utilized together in any combination, as will be appreciated by those of skill in the art. For example, a pulse-welded portion 118 including a first section 128a and a second section 128b (FIG. 6) may be combined with a CW-welded portion 46 including a single section (FIG. 3) to form a composite seam weld. Other examples will be apparent to those of skill in the art and fall within the scope of the disclosure and the following claims.

EXAMPLES

Example 1

Figure 7A:
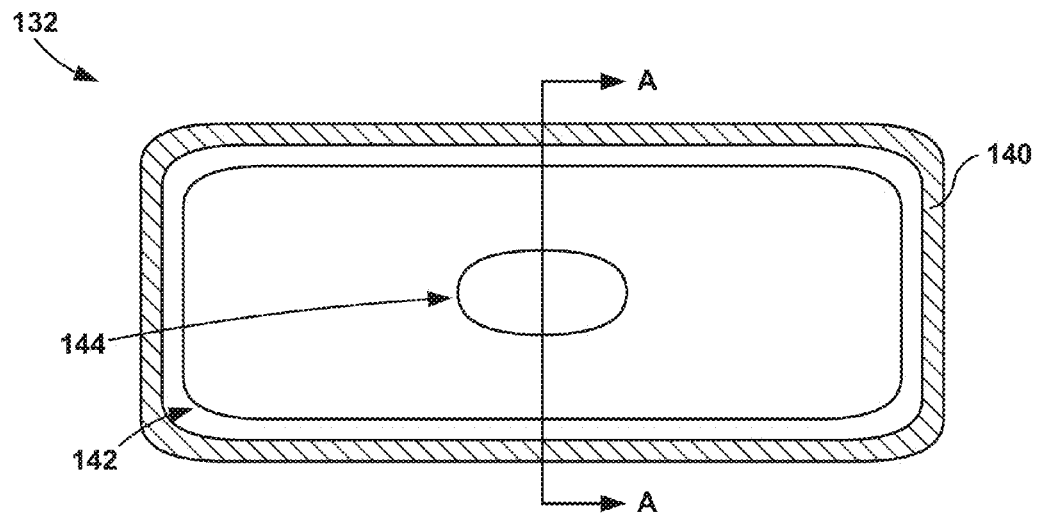
FIGS. 7A and 7B are conceptual diagrams that illustrate an example A-configuration anode coil disposed in a cavity of a battery housing.
Figure 7B:
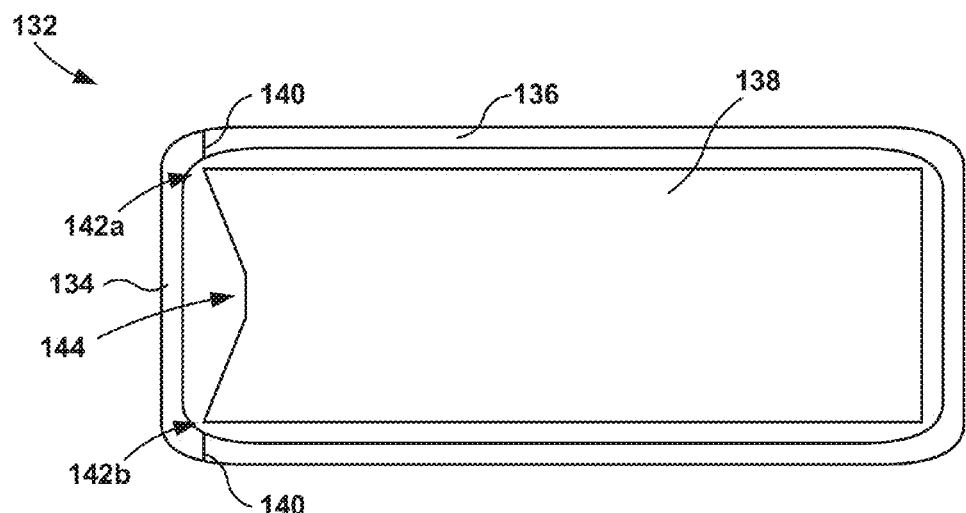

Fifty samples of anode coils enclosed in an anode separator material were coiled to produce a specific coil geometry, which may be referred to as the A-configuration. Ten samples of anode coils enclosed in an anode separator material were coiled to produce a flat coil configuration. FIGS. 7A and 7B show a conceptual representation of an A-configuration coil disposed in a battery housing. FIG. 7A is a top view of an A-configuration coil 142 disposed in battery housing 132. FIG. 7B is a cross-section taken along line A-A shown in FIG. 7A. As shown in FIG. 7B, battery housing 132 includes a battery case 136 and a battery cover 134. Battery cover may be welded to battery case 136 using a seam weld 140. Anode coil 138 includes a geometry referred to as an A-configuration, in which an outer portion 142a, 142b (collectively, "outer portion 142") of the anode coil 138 is closer to battery cover 134 than an inner portion 144 of anode coil 138. The A-configuration may result from the coiling process by which anode coil 138 is formed. In some examples, the height distribution of anode coil 138 may be somewhat symmetric, and the outer portion 142 of anode coil 138 may be relatively close to seam weld 140 along the entire length of seam weld 140, as shown in FIG. 7B. In other examples, the height distribution of anode coil 138 may be asymmetric, and one section of outer portion 142 of anode coil 138 may be closer to seam weld 140 than another section of outer portion 142 of anode coil 138.

Figure 8:
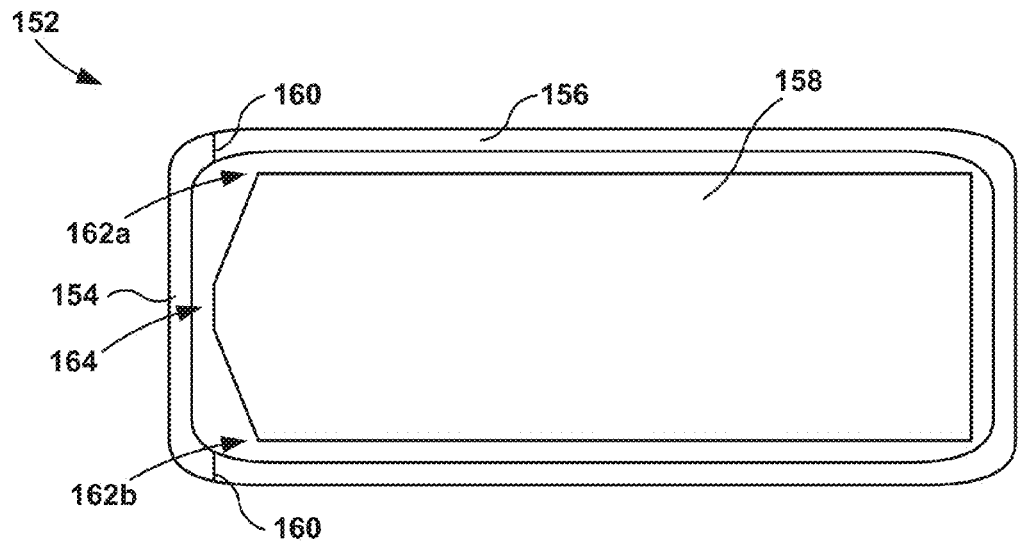
FIG. 8 is a conceptual diagram that illustrates an example V-configuration anode coil disposed in a cavity of a battery housing.

Another configuration of an anode coil is illustrated in FIG. 8. The anode coil configuration illustrated in FIG. 8 may be referred to as a V-configuration. As shown in FIG. 8, battery housing 152 includes a battery case 156 and a battery cover 154. Battery cover 154 may be welded to battery case 156 using a seam weld 160. Anode coil 158 includes a geometry referred to as a V-configuration, in which an outer portion 162a, 162b of the anode coil 158 is further from battery cover 154 than an inner portion 164 of anode coil 158. The V-configuration may result from the coiling process by which anode coil 158 is formed. In some examples, the height distribution of anode coil 158 may be somewhat symmetric, and the outer portion 162 of anode coil 158 may be relatively far from seam weld 160 along the entire length of seam weld 160. In other examples, the height distribution of anode coil 158 may be asymmetric, and one section of outer portion 162 of anode coil 158 may be closer to seam weld 160 than another section of outer portion 162 of anode coil 158.

Figure 9:
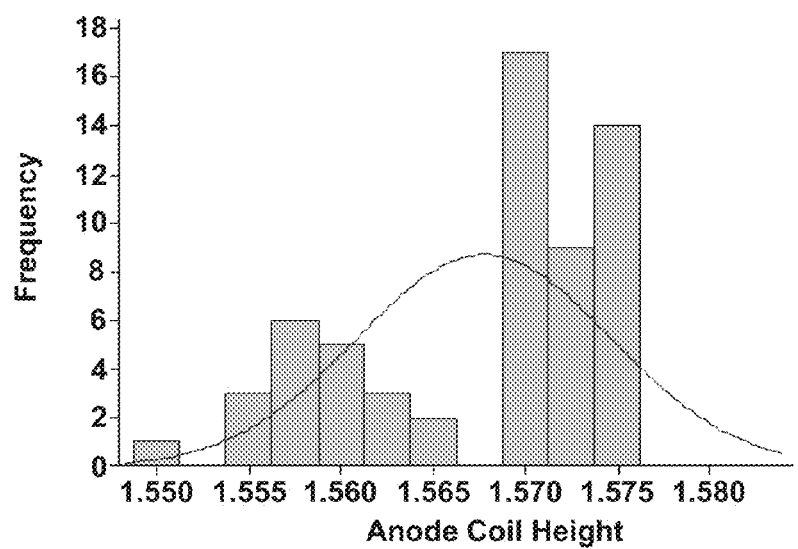
FIG. 9 is a histogram that illustrates the distribution of coil heights for each of the sixty anode coil samples.

FIG. 9 is a histogram that illustrates the distribution of coil heights for each of the sixty anode coil samples. The coil heights were measured in the direction of the x-axis shown in FIGS. 6A and 6B.

Each of the sixty samples were inserted in similar battery housings. The anode coil configuration for samples 21-30 was intended to be flat with shorter lengths compared to the experimental subjects. Although the control samples 21-30 were shorter, the coils had an A-configuration after coiling. The battery housings (e.g., the battery cover 134 or 154 and battery case 136 or 156) were tacked and welded using the welding parameters shown in Table 1.

TABLE 1

| Sample Number | Mode | Weld Power (Percentage of Maximum Intensity) | Purpose | Coil Configuration |
|---|---|---|---|---|
| 1-20 | CW | 482 W (44.75%) | Experimental Subjects | A |
| 21-30 | CW | 482 W (44.75%) | Control Group 2 | A* |
| 31-50 | CW | 508 W (46.75%) | Experimental Subjects | A |
| 51-60 | CW | 508 W (46.75%) | Control Group 1 | Flat |

Following completion of welding, all samples were tested by applying a high potential (voltage) across the anode and cathode electrodes to test for electrical shorts.

After Hi-Pot testing was completed, the battery housings 132 or 152 were opened using a milling machine. The anode separator materials and other components enclosed in the battery housings 132, 152 were inspected for thermal effects due to the welding. During inspection, damage due to the opening of battery housings 132 or 152 was also noted under the column "Bench Damage." Table 2 shows the ranking values for liner damage and separator damage and the corresponding description. Table 3 shows the weld power used for the seam weld, the height of the anode coil, the liner (protective insulation) damage and separator (thermally sensitive module) damage values, whether a separator (thermally sensitive module) hole was present due to the welding process, whether a mark was present of the feedthrough, whether opening of battery housings 132 or 152 caused damage ("Bench Damage"), and whether thermal transparency was observed on the separator (thermally sensitive module).

TABLE 2

| Ranking | 1 | 2 | 3 | 4 | 5 |
| --- | --- | --- | --- | --- | --- |
| Liner | Acceptable No melting | Acceptable Minor melt impression, no holes | Acceptable but Undesirable High degree of melting but no holes | Acceptable but Highly Undesirable Very high degree of melting with holes with line of sight | Not Acceptable Melting with holes compromising line of sight design intent |
| Separator | No melting | Minor opaqueness, no holes | Melting with transparency | NOT compromised High degree of melting with transparency but no holes | Melting with holes |

TABLE 3

| Power (W) | Height (inch) | Height (mm) | Liner Damage | Separator Damage | Separator Hole | Feedthrough Mark | Bench Damage | Thermal Transparency |
| --- | --- | --- | --- | --- | --- | --- | --- | --- |
| 480 | 1.574 | 39.9796 | — | — | — | — | Yes | Yes |
| 480 | 1.569 | 39.8526 | — | — | — | — | — | — |
| 480 | 1.573 | 39.9542 | — | — | No | Yes | — | Yes |
| 480 | 1.575 | 40.005 | 4 | 5 | Hole | — | Yes | Yes |
| 480 | 1.575 | 40.005 | 3.5 | 2.5 | No | Yes | Yes | No |
| 480 | 1.569 | 39.8526 | 3.5 | 4 | No | Yes | Yes | Yes |
| 480 | 1.574 | 39.9796 | 3 | 3 | No | Yes | Yes | No |
| 480 | 1.573 | 39.9542 | 3.5 | 2.5 | No | Weak | Yes | No |
| 480 | 1.575 | 40.005 | 3 | 2.5 | No | No | Yes | Weak |
| 480 | 1.575 | 40.005 | 4 | 5 | Open | Yes | Yes | Yes |
| 480 | 1.575 | 40.005 | 3.5 | 4 | No | Yes | Yes | Yes |
| 480 | 1.572 | 39.9288 | 3.5 | 5 | No | No | Yes | Yes |
| 480 | 1.571 | 39.9034 | 4 | 5 | Open | Weak | Yes | Yes |
| 480 | 1.569 | 39.8526 | 3.5 | 3.5 | No | Yes | Yes | Weak |
| 480 | 1.574 | 39.9796 | 2.5 | 2 | No | Yes | Yes | Yes |
| 480 | 1.575 | 40.005 | 4 | 5 | Open | Yes | Yes | Yes |
| 480 | 1.571 | 39.9034 | 3 | 4 | No | No | Yes | Yes |
| 480 | 1.57 | 39.878 | 3 | 2.5 | No | Yes | Yes | No |
| 480 | 1.57 | 39.878 | 3.5 | 2.5 | No | Yes | Yes | No |
| 480 | 1.574 | 39.9796 | 4 | 5 | Open | No | Yes | Yes |
| 480 | 1.559 | 39.5986 | 2.5 | 2.5 | No | No | No | No |
| 480 | 1.565 | 39.751 | 2.5 | 2.5 | No | No | No | No |
| 480 | 1.563 | 39.7002 | 2.5 | 2.5 | No | No | No | No |
| 480 | 1.564 | 39.7256 | 2.5 | 2.5 | No | Weak | Yes | Yes |
| 480 | 1.563 | 39.7002 | — | — | — | — | — | — |
| 480 | 1.558 | 39.5732 | 2.5 | 2.5 | No | Weak | Yes | No |
| 480 | 1.557 | 39.5478 | 2.5 | 4 | No | Weak | Yes | Yes |
| 480 | 1.562 | 39.6748 | 2.5 | 4 | No | No | Yes | Yes |
| 480 | 1.561 | 39.6494 | 2.5 | 5 | Open | No | Yes | Yes |
| 480 | 01.56 | 39.624 | 4 | 4 | No | Weak | Yes | Yes |
| 500 | 1.573 | 39.9542 | 3.5 | 3 | No | Yes | Yes | No |
| 500 | 1.57 | 39.878 | 4 | 4 | No | Weak | Yes | Yes |
| 500 | 1.575 | 40.005 | 2.5 | 2.5 | No | Yes | Yes | Yes |
| 500 | 1.57 | 39.878 | 4 | 4 | No | Yes | Yes | Yes |
| 500 | 1.574 | 39.9796 | — | — | No | Weak | Yes | Yes |
| 500 | 1.574 | 39.9796 | — | — | No | Yes | Yes | Yes |
| 500 | 1.575 | 40.005 | — | — | No | Yes | Yes | Yes |
| 500 | 1.569 | 39.8526 | — | — | No | Yes | Yes | Yes |
| 500 | 1.571 | 39.9034 | — | — | No | No | Yes | No |
| 500 | 1.572 | 39.9288 | 4 | 5 | Open | No | Yes | Yes |
| 500 | 1.571 | 39.9034 | 3.5 | 3 | No | No | Yes | Yes |
| 500 | 1.571 | 39.9034 | 4 | 4 | No | No | Yes | Yes |
| 500 | 1.57 | 39.878 | 4 | 4 | No | No | Yes | Yes |
| 500 | 1.57 | 39.878 | 3.5 | 2.5 | No | No | Yes | No |
| 500 | 1.571 | 39.9034 | 4 | 5 | Open | No | Yes | Yes |
| 500 | 1.571 | 39.9034 | 3 | 2.5 | No | Weak | Yes | No |
| 500 | 1.573 | 39.9542 | 3.5 | 2.5 | No | Weak | Yes | Yes |
| 500 | 1.572 | 39.9288 | 4 | 4 | No | No | Yes | Yes |
| 500 | 1.572 | 39.9288 | — | — | No | Weak | Yes | Yes |
| 500 | 1.572 | 39.9288 | 4 | 4 | No | No | Yes | Yes |
| 500 | 1.557 | 39.5478 | — | — | No | No | No | No |
| 500 | 1.554 | 39.4716 | 2 | 2 | No | No | No | No |
| 500 | 1.558 | 39.5732 | 2 | 2 | No | No | No | No |
| 500 | 1.557 | 39.5478 | 2 | 2 | No | No | No | No |
| 500 | 1.558 | 39.5732 | 2 | 2 | No | No | No | No |
| 500 | 1.555 | 39.497 | 2 | 2 | No | No | No | No |
| 500 | 1.551 | 39.3954 | 2 | 2 | No | No | No | No |
| 500 | 1.556 | 39.5224 | 2 | 2 | No | — | No | — |
| 500 | 1.56 | 39.624 | 2 | 1.5 | No | No | No | No |
| 500 | 1.559 | 39.5986 | 3 | 3 | No | — | No | — |

Figure 10:
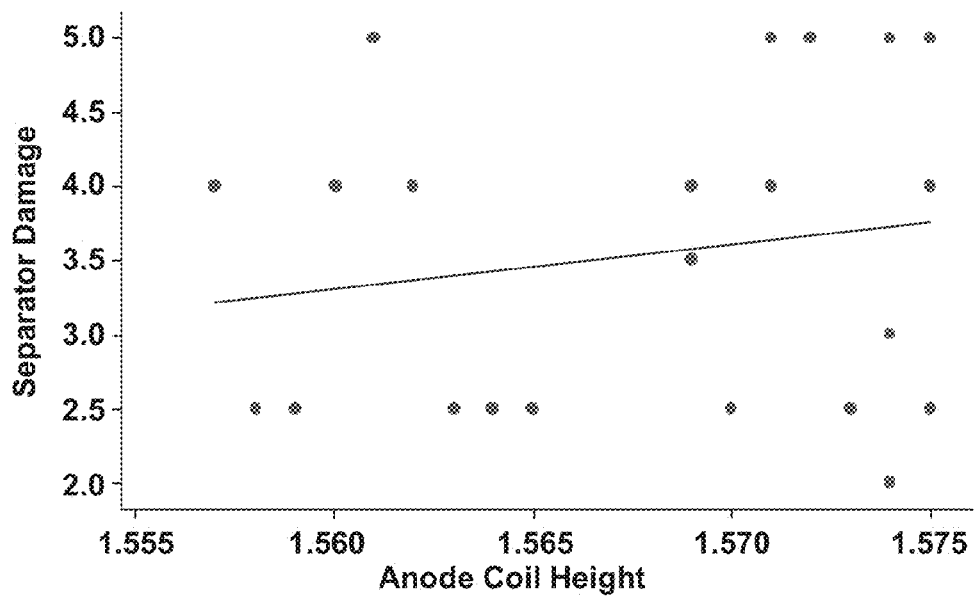
FIGS. 10 and 11 are scatter diagrams plotting anode separator material damage as a function of anode coil height for lower power welds and higher power welds, respectively.
Figure 11:
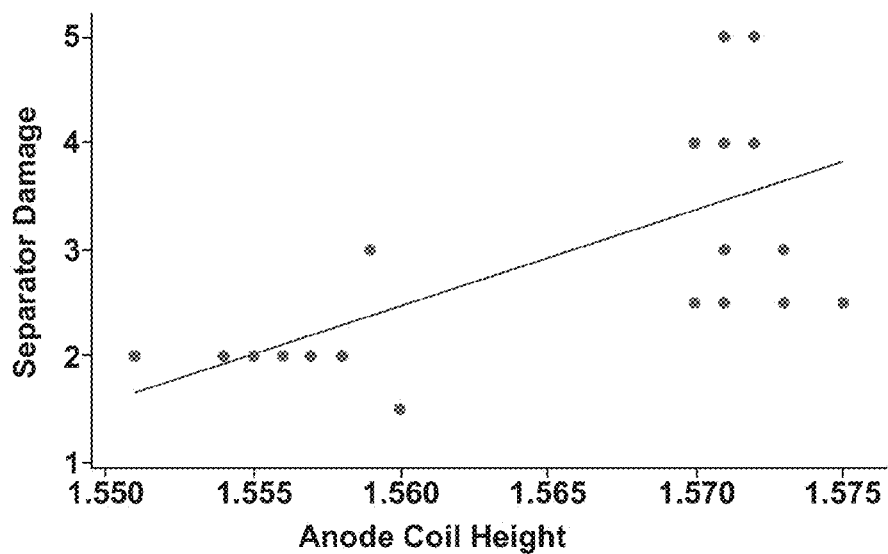

Once the data were collected, anode separator material damage was plotted as a function of anode coil height for the lower power welds (at 482 W) and separately for the higher power welds (at 500 W). The results are shown in the scatter plots of FIGS. 10 and 11, respectively. For the low power results, shown in FIG. 10, the R-squared value is 2.8% and the P-value is 0.410, which indicates a poor fit in the data and the poor correlation between separator damage and coil height. For the high power results, shown in FIG. 11, the R-squared value is 44.8%, which indicates a better, though still poor fit of the regression line to the data. The P-value for the high power data is 0, which indicates there is correlation between separator damage and coil height for the high power data.

That data show that there may not be a strong correlation between coil height and thermal effects on the anode separator material, particularly at the low weld power. However, all but 10 of the coil samples were coiled with an A-configuration, and the 10 samples that were not coiled in the A-configuration exhibited thermal scores of 3 or lower. These results suggested that further experimentation to understand the effects of coil configuration on welding would be beneficial.

Example 2

A completely randomized full factorial design of experiment was designed to study battery case welding using CW welding. Factors included in the study were anode separator material length, coil configuration, presence and absence of a shim, and case-cover weld power. The anode separator material was used either in standard length (about 153.67 mm or about 6.05 inches) or long length (about 179.07 mm or about 7.05 inches). The coil configurations utilized were A-configuration (shown in FIGS. 7A and 7B) and V-configuration (shown in FIG. 8). Presence and absence of a 0.508 mm (about 0.02 inch) shim during tab welds of the anode of the battery to the feedthrough pin of the battery and the cathode pin of the battery to the cover of the battery was also studied. It was hypothesized that presence of the shim would push the coil away from the battery case-cover seam weld zone. Finally, battery case-cover weld power was studied. A low power (about 480 W) and a high power (about 520 W) weld were used.

Figure 12:
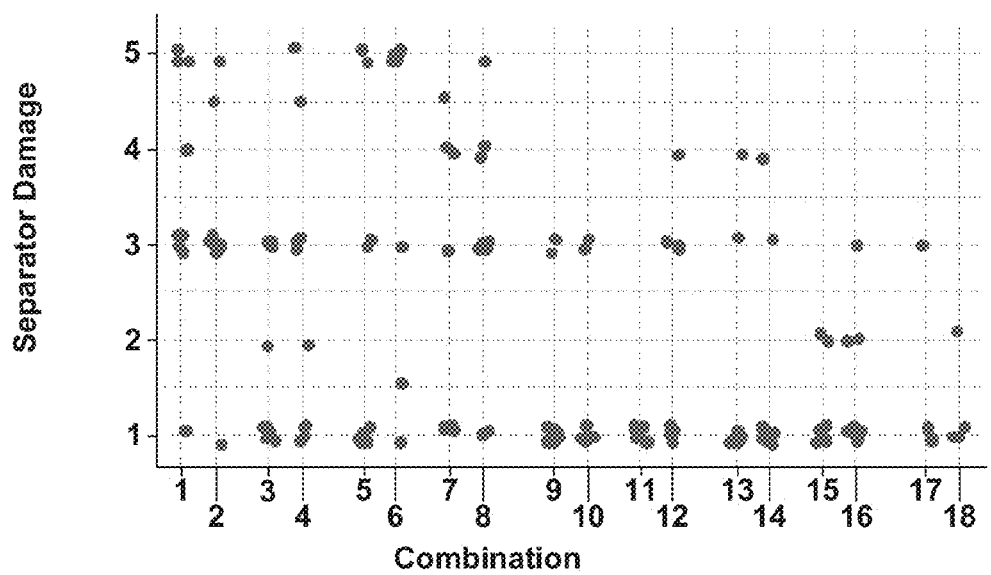
FIG. 12 is a scatter diagram that plots the anode separator material damage versus combination.

Various outcomes were analyzed for the various combinations of factors tested. FIG. 12 is a scatter diagram that plots the anode separator material damage (on the scale set forth in Table 2) versus combination. Combination 1 was A-configuration coil, short anode separator material, no shim, and low power laser. Combination 2 was A-configuration coil, short anode separator material, no shim, and high power laser. Combination 3 was A-configuration coil, short anode separator material, shim present, and low power laser. Combination 4 was A-configuration coil, short anode separator material, shim present, and high power laser. Combination 5 was A-configuration coil, long anode separator material, no shim, and low power laser. Combination 6 was A-configuration coil, long anode separator material, no shim, and high power laser. Combination 7 was A-configuration coil, long anode separator material, shim present, and low power laser. Combination 8 was A-configuration coil, long anode separator material, shim present, and high power laser.

Combination 9 was V-configuration coil, short anode separator material, no shim, and low power laser. Combination 10 was V-configuration coil, short anode separator material, no shim, and high power laser. Combination 11 was V-configuration coil, short anode separator material, shim present, and low power laser. Combination 12 was V-configuration coil, short anode separator material, shim present, and high power laser. Combination 13 was V-configuration coil, long anode separator material, no shim, and low power laser. Combination 14 was V-configuration coil, long anode separator material, no shim, and high power laser. Combination 15 was V-configuration coil, long anode separator material, shim present, and low power laser. Combination 16 was V-configuration coil, long anode separator material, shim present, and high power laser.

Combination 17 was a control, with a substantially flat coil, a short anode separator material, no shim, and low power laser. Combination 18 was another control, with a substantially flat coil, a short anode separator material, no shim, and high power laser.

FIG. 12 shows that A-configuration coils exhibited a higher propensity to suffer thermal damage on the anode separator material than V-configuration coils. Thermal damage (level 4.5 or 5) was seen on some A-configuration coils regardless of the weld power used, whether a shim was present or absent, and whether the anode separator material was long or short. None of the V-configuration coils or the control coils showed unacceptable levels of thermal damage (level 4.5 and 5), indicating that CW welding may be viable if the anode coil is in a V-configuration or is substantially flat (i.e., is not in an A-configuration).

Figure 13:
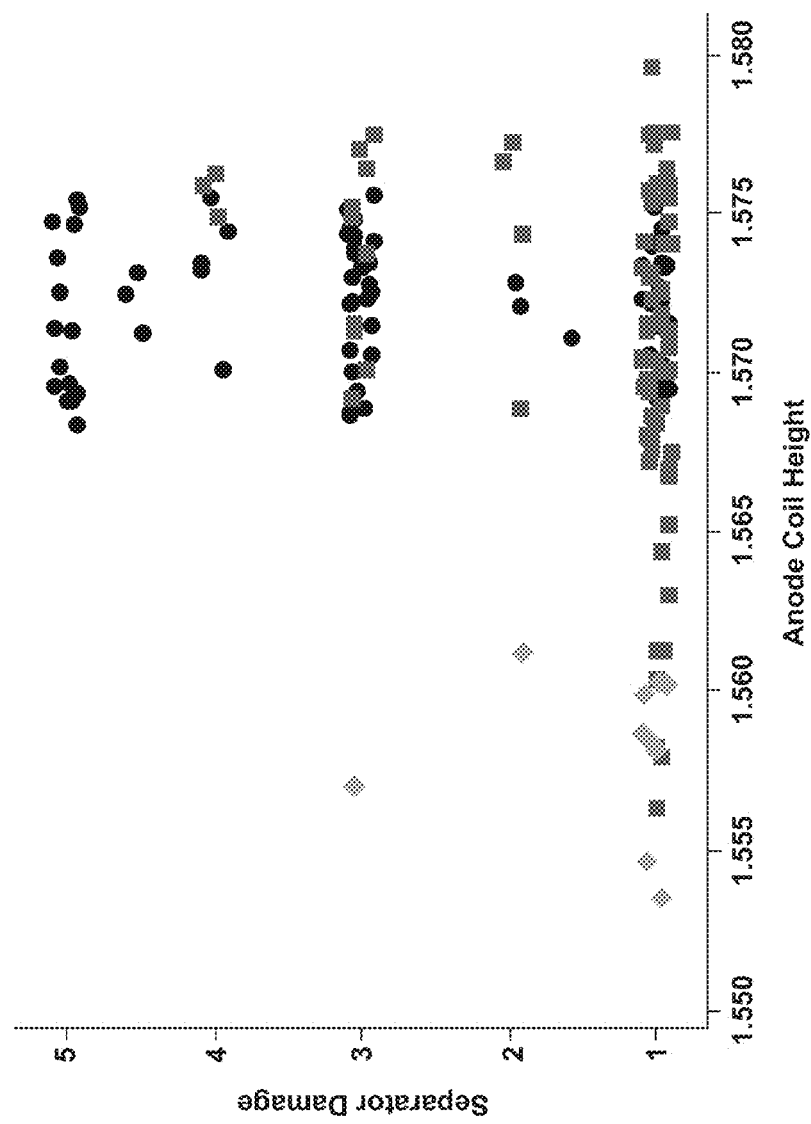
FIG. 13 is a scatter plot that shows the anode separator material damage plotted versus anode coil height for each of A-configuration coils, V-configuration coils, and control coils.

FIG. 13 is a scatter plot that shows the anode separator material damage plotted versus anode coil height for each of A-configuration coils, V-configuration coils, and control coils. The A-configuration coils are represented as circles. The V-configuration coils are represented as squares. The control coils are represented as diamonds. The scatter plot shown in FIG. 13 supports the hypothesis that coil height is not the only factor that affects the thermal damage shown by the anode separator material. The coil configuration also contributes to thermal damage; A-configuration coils are more likely to show thermal damage compared to V-configuration coils of the same height.

Each of the configurations was also Hi-Pot tested prior to opening the battery housing and removing the coils to determine the thermal effects on each coil. All coils passed the Hi-Pot testing and did not demonstrate any electrical shorts.

Figure 14:
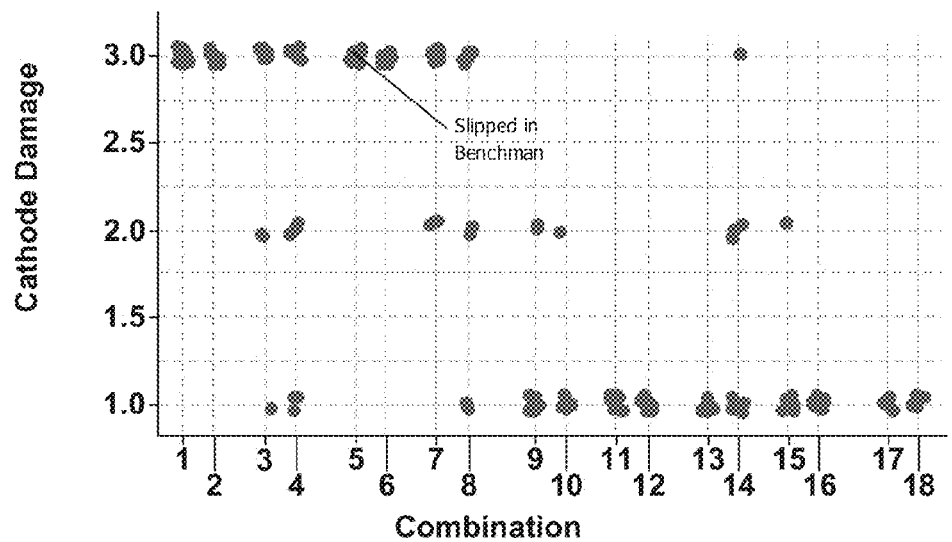
FIG. 14 is a scatter plot that shows damage rating versus combination.

Each of the combinations was also inspected for mechanical damage to the cathode due to cutting open the battery case to remove using the Benchman cutter. FIG. 14 is a scatter plot that shows damage rating versus combination. A damage rating of "1" indicates no damage, while a damage rating of "2" indicates the cathode was lightly damaged and a damage rating of "3" indicates a severely damaged cathode. The combinations correspond to those described above with respect to FIG. 12. As shown in FIG. 14, A-configuration coils were more likely to result in damage to the cathode during cutting the battery case open.

Figure 15:
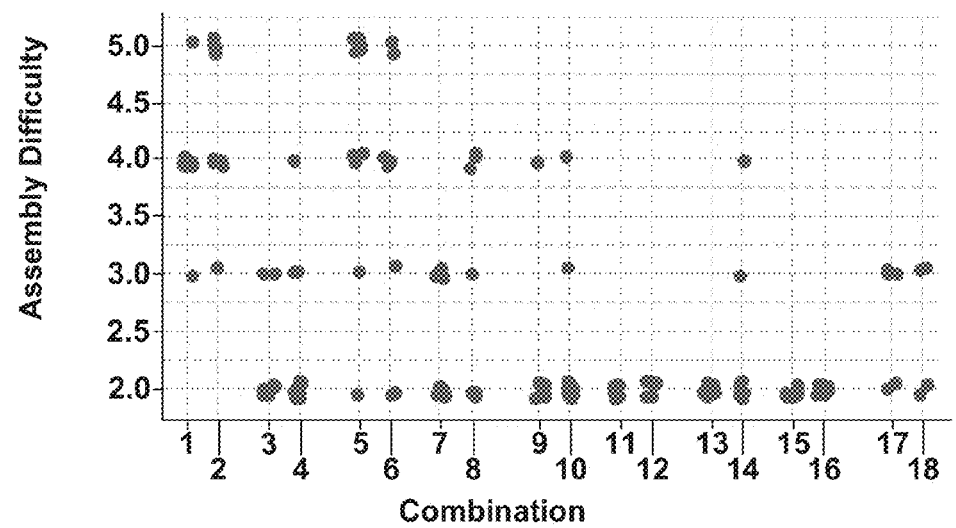
FIG. 15 is a scatter plot that illustrates assembly difficulty of the battery cover and the battery case before welding.

FIG. 15 is a scatter plot that illustrates assembly difficulty of the battery cover and the battery case before welding. An assembly difficulty of 1 would represent extremely easy, such as would occur without a coil disposed in the cavity formed by the battery cover and battery case. An assembly difficulty of "2.0" indicates that the battery case and battery cover were able to be aligned without pushing needed to center the battery cover on the battery case. An assembly difficulty of "3.0" indicates that more pushing was needed to center the battery cover on the battery case (compared to a difficulty of "2.0"). An assembly difficulty of "4.0" indicates that some pushing was needed to align the battery case and cover. Finally, an assembly difficulty of "5.0" indicates that a large amount of pushing and sometimes multiple attempts were required to align the battery case and battery cover. The combinations listed in FIG. 15 correspond to the combinations described with respect to FIG. 12. As FIG. 15 shows, A-configuration coils generally were more difficult to assemble than V-configuration coils or control coils. Among V-configuration coils, a shim being present generally eased assembly of the battery case and battery cover.

Based on the data shown in FIGS. 12-15, V-configuration coils were generally more resilient to thermal effects than A-configuration coils. Furthermore, a shim being present and low weld power is generally desirable. Additionally, the long separator did not mitigate thermal effects on A-configuration coils, regardless of the weld power used.

Example 3

Because all thermal effects were shown only on a posterior end of the batter case and coil, a hybrid welding scheme (e.g., using both CW welding and pulsed welding) was selected to be studied to attempt to mitigate thermal effects on the liner and anode separator material. In hybrid welding, the posterior end of the battery case and cover was welded using pulsed welding, while the remaining portion of the battery case and cover was welded using CW welding.

CW wave welding was performed at a laser power of about 477 W. Pulsed welding was performed at pulse width of about 5 milliseconds (msec), a pulse rate of about 40 Hz, and approximately 80% overlap (based on area of the pulse welds) between adjacent pulses. The peak power of the pulses was varied to examine visual effects of the different peak powers on the seam weld formed using pulse welding. Table 4 shows the visual observations of the weld for each of the different peak powers used in pulsed welding. As shown in Table 4, a higher peak power generally resulted in more soot, while a lower peak power generally resulted in less soot.

TABLE 4

| Sample | Peak Power (W) | Visual Observations |
| --- | --- | --- |
| 1 | 759 | Very sooty and extreme discoloration |
| 2 | 685 | Less soot, cleaner than sample 1 |
| 3 | 708 | Sooty |
| 4 | 627 | Very Sooty |
| 5 | 571 | Very Sooty |
| 6 | 460 | Very Clean |
| 7 | 404 | Very Clean |
| 8 | 292 | Very Clean |

Figure 16:
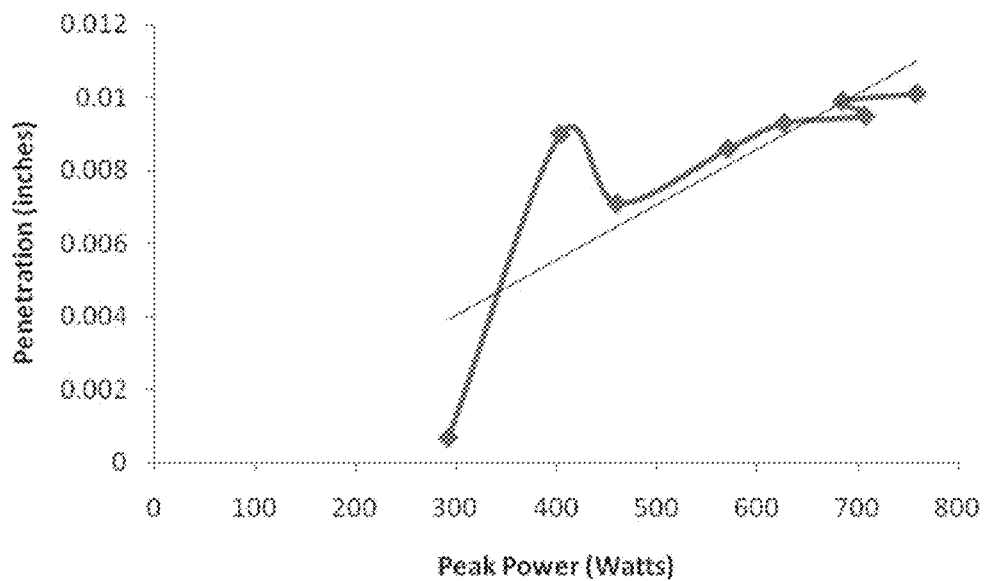
FIG. 16 is a line diagram that plots the minimum weld penetration in the pulsed welded portion versus peak laser power.

Each of samples 1-8 was also visually inspected using a microscope to determine weld penetration. FIG. 16 is a line diagram that plots the minimum weld penetration in the pulsed welded portion versus peak laser power. The straight line shown in FIG. 16 is a linear best-fit line of the data. All samples welded with a peak pulse power of greater than 404 W produced the desired weld penetration. However, all samples welded with a power of greater than 460 W showed significant amounts of soot.

Figure 17:
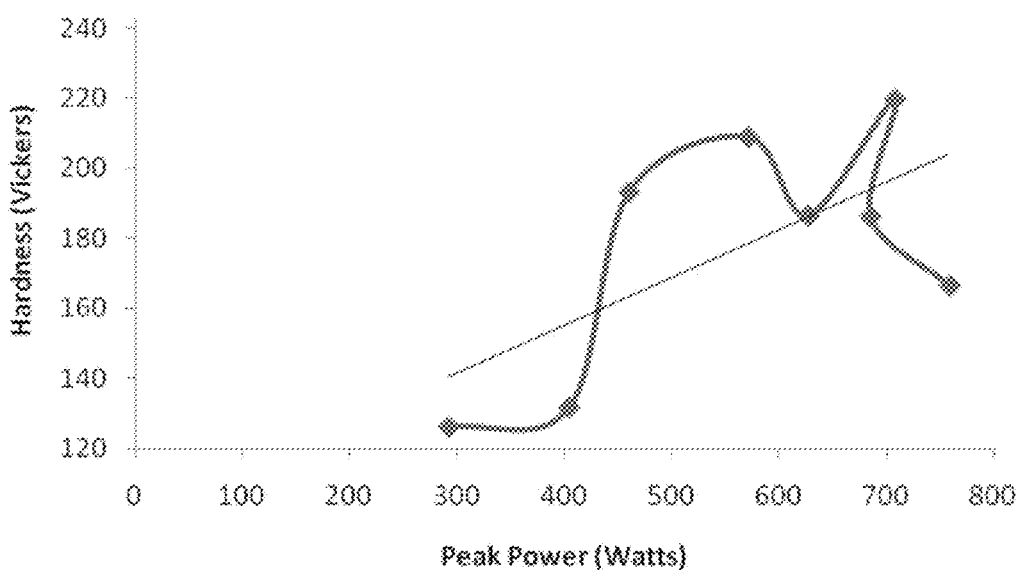
FIG. 17 is a line diagram that shows a plot of the hardness value versus the peak pulse power.

Hardness values for the pulsed welded portion were also determined using a Vickers hardness tester. FIG. 17 is a line diagram that shows a plot of the hardness value versus the peak pulse power. The straight line shown in FIG. 17 is a linear best-fit line of the data. As shown in FIG. 17, among samples that appeared clean (not sooty) only two power levels produced a desirable hardness of less than 200 HV (Vickers).

This series of experiments suggested that it is feasible to achieve a weld penetration of greater than about 0.0762 mm (about 0.003 inches) while producing a clean weld at a weld power of between about 404 W and about 460 W. However, the parameters chosen for pulse welding produce higher than desirable hardness, so further study was required to find parameters that produce lower hardness.

Example 4

An experiment was designed to attempt to identify pulse welding setting that would produce a minimum weld penetration of about 0.1524 mm (about 0.006 inch) while producing minimal or no soot. Table 5 shows the pulse welding parameters and resulting minimum weld penetration. For each sample, pulse welding was performed at a pulse rate of about 10 Hz, with an overlap between adjacent pulses of about 0.508 mm (about 0.02 inches). A soot rank of "1" indicates substantially no soot. A soot rank of "3" indicates some soot. A soot rank of "5" indicates very sooty.

TABLE 5

| Sample | Peak Power (W) | Pulse Width (ms) | Soot Rank | Minimum Penetration (inches) | Minimum Penetration (mm) |
| --- | --- | --- | --- | --- | --- |
| A1 | 525 | 7 | 4 | 0.104 | 2.6416 |
| A2 | 463 | 7 | 3 | 0.0092 | 0.23368 |
| A3 | 430 | 7 | 2 | 0.0068 | 0.17272 |
| A4 | 407 | 7 | 1 | 0.0048 | 0.12192 |
| A5 | 407 | 7 | 1 | 0.0049 | 0.12446 |
| A6 | 430 | 7 | 1 | 0.005 | 0.127 |
| A7 | 463 | 7 | 3 | 0.0069 | 0.17526 |
| A8 | 525 | 7 | 4 | 0.0101 | 0.25654 |

No combination of the above parameters resulted in the desired weld penetration of about 0.1524 mm (about 0.006) inches with little or no soot. Additional combinations of parameters were tested, as shown in Table 6. In the examples shown in Table 6, the peak weld power was held at 407 W, while the pulse width was varied.

TABLE 6

| Sample | Peak Power (W) | Pulse Width (ms) | Soot Rank | Minimum Penetration (inches) | Minimum Penetration (mm) |
| --- | --- | --- | --- | --- | --- |
| B1 | 407 | 8 | 1 | 0.0054 | 0.13716 |
| B2 | 407 | 8 | 1 | 0.0056 | 0.14224 |
| B3 | 407 | 9 | 1 | 0.0077 | 0.19558 |
| B4 | 407 | 9 | 1 | 0.0081 | 0.20574 |
| B5 | 407 | 10 | 1 | 0.0084 | 0.21336 |
| B6 | 407 | 10 | 1 | 0.0084 | 0.21336 |

These results show that using a peak pulse power of 407 W and a pulse width of 9 ms or 10 ms can result in the desired weld penetration while producing little or no soot.

An additional experiment was performed in which the pulsed welded portion was welded beginning at two different starting positions with pulses delivered to each position in an alternating manner, e.g., as described with respect to FIGS. 6A and 6B. Such a method of pulse welding may be referred to as "tick-tock mode" or a "multi-start weld path," as opposed to pulse welding the entire pulse welded perimeter as one continuous segment. The hypothesis was that, when the pulse welded portion was broken into segments, heat input into each segment would be reduced since the frequency at which pulses are delivered to the section is reduced.

Table 7 shows the results for the "tick-tock mode" welding, including the observed maximum hardness of the pulse welded portion. For the "C," "D," and "E" sequences of samples, a pulse rate of 10 Hz (5 Hz in each segment) was used with an overlap of about 0.508 mm (about 0.02 inch)

between adjacent pulses. For the "F" and "G" sequence of samples, a pulse rate of 10 Hz (5 Hz in each segment) was used with an overlap of about 0.5588 mm (about 0.22 inch) between adjacent pulses.

TABLE 7

| Sample | Peak Power (W) | Pulse Width (msec) | Soot Rank | Minimum Penetration (inches) | Minimum Penetration (mm) | Maximum Hardness (HV) |
|---|---|---|---|---|---|---|
| C1 | 407 | 8 | 1 | 0.0054 | 0.13716 | 161 |
| C2 | 407 | 8 | 1 | 0.0066 | 0.16764 | 158.6 |
| C3 | 407 | 8 | 1 | 0.0045 | 0.1143 | 167.3 |
| D1 | 407 | 9 | 1 | 0.0090 | 0.2286 | 168.1 |
| D2 | 407 | 9 | 1 | 0.0090 | 0.2286 | 164.1 |
| D3 | 407 | 9 | 1 | 0.0092 | 0.23368 | 170.7 |
| E1 | 407 | 10 | 1 | 0.0091 | 0.23114 | 166.8 |
| E2 | 407 | 10 | 1 | 0.0094 | 0.23876 | 146.7 |
| E3 | 407 | 10 | 1 | 0.0091 | 0.23114 | 164.2 |
| F1 | 407 | 7 | 1 | 0.0051 | 0.12954 | 155.9 |
| F2 | 407 | 7 | 1 | 0.0066 | 0.16764 | 152.1 |
| F3 | 407 | 7 | 1 | 0.0072 | 0.18288 | 149 |
| G1 | 430 | 7 | 1 | 0.0082 | 0.20828 | 162.1 |
| G2 | 430 | 7 | 1 | 0.0067 | 0.17018 | 154 |
| G3 | 430 | 7 | 1 | 0.0073 | 0.18542 | 157.4 |

The above experiments showed it is possible to get desirable weld penetration of greater than about 0.1524 mm (about 0.006 inch) while getting minimal to no soot and a hardness of less than 180 HV during pulse welding.

Example 5

An experiment was then designed to determine a range of pulsed welding parameters that result in substantially no thermal damage to components in the battery housing when the anode coils are in the A-configuration.

The following parameters were fixed for all samples: an overlap between adjacent pulses of about 0.508 mm (about 0.020 inch), a pulse width of about 10 ms, a delay between pulses of about 100,000 microsecond (μs) (a pulse rate of about 2.5 Hz/segment), and 2 segments. The peak pulse power was varied to determine a range of peak pulse powers that results in no thermal damage to components within the battery housing, a minimum weld penetration of about 0.1524 mm (about 0.006 inch), and hardness less than 200 HV. The results are shown in Table 8.

TABLE 8

| Power (W) | Soot Rank | Liner Damage | Separator Damage | Minimum Weld Penetration (mil) | Minimum Weld Penetration (mm) | Hardness (HV) |
|---|---|---|---|---|---|---|
| 350 | 1 | 1 | 1 | 4.7 | 0.11938 | 161.2 |
| 350 | 1 | 1 | 1 | 4 | 0.1016 | 168.9 |
| 350 | 1 | 1 | 1 | 4.8 | 0.12192 | 171 |
| 375 | 1 | 1 | 1 | 6.5 | 0.1651 | 168 |
| 375 | 1 | 1 | 1 | 4.7 | 0.11938 | 180.2 |
| 375 | 1 | 1 | 1 | 5.5 | 0.1397 | 174.1 |
| 400 | 1 | 1 | 1 | 6.3 | 0.16002 | 160.1 |
| 400 | 1 | 1 | 1 | 7 | 0.1778 | 178.3 |
| 400 | 1 | 1 | 1 | 6.5 | 0.1651 | 168.5 |
| 435 | 3 | 1 | 1 | 8.5 | 0.2159 | 170.2 |
| 435 | 1 | 1 | 1 | 9.1 | 0.23114 | 166.7 |
| 435 | 1 | 1 | 1 | 9.2 | 0.23368 | 168.9 |
| 435 | 3 | 1 | 1 | 9.4 | 0.23876 | 172.2 |
| 445 | 3 | 1 | 1 | 9.4 | 0.23876 | 164.5 |
| 445 | 3 | 1 | 1 | 9.1 | 0.23114 | 162.5 |
| 465 | 3 | 1 | 1 | 9.4 | 0.23876 | 161 |
| 465 | 1 | 1 | 1 | 10.01 | 0.254254 | 165.9 |
| 465 | 1 | 1 | 1 | 10 | 0.254 | 154.7 |
| 475 | 3 | 1 | 1 | 10.2 | 0.25908 | 144.5 |
| 475 | 3 | 1 | 1 | 10 | 0.254 | 164.6 |
| 495 | 5 | 1 | 1 | 10.4 | 0.26416 | 163.1 |
| 530 | 5 | 1 | 1 | 11.3 | 0.28702 | 160.5 |
| 530 | 5 | 1 | 1 | 9.7 | 0.24638 | 164.2 |
| 580 | 5 | 2 | 2 | 11.2 | 0.28448 | 176.4 |
| 620 | 5 | 2 | 5 | 11.4 | 0.28956 | 183.3 |
| 670 | 5 | 3 | 4 | 12.1 | 0.30734 | 165.4 |

The results shown in Table 8 indicate that pulse welding at over 40% of the maximum laser current that the laser can output (Imax; 40% of Imax is about 407 W) and lower than 55% Imax (about 580 W) most likely will meet the desirable weld penetration, hardness, and thermal effects properties. At above about 44% Imax (about 435 W), the pulsed welding process causes soot. Soot is low up to about 48% Imax (about 475 W).

Example 6

Another example was designed to determine pulsed welding parameters that reduce thermal effects on A-configuration anode coils. First, it was hypothesized that biasing the cover towards the posterior end of the battery would reduce at least some amount of heat being introduced to the interior components (e.g., liner and anode separator material) than when the cover is less biased towards the posterior end of the battery. To test this hypothesis, two samples with a relatively large bias towards the anterior of the battery (the headspace side) and two samples with no bias of the cover were welded. The samples each included A-configuration coils. The samples were welded using a peak pulse energy of about 540 W. Each of the four samples showed significant thermal effects. Thus, the experiment did not show that cover bias had any influence on thermal effects.

Another experiment was designed to determine if a lower pulse rate would reduce thermal effects. This expectation was based on an observation that a sample welded at a pulse rate of 1 Hz per weld segment did not show any thermal effects while a sample welded at a pulse rate of 2.5 Hz per weld segment did show thermal effects. The welding process was performed as described in FIG. 6A, although a middle section of pulse welded portion 118 (e.g., near location 122) was welded at a rate of 2 Hz with a continuous path of the energy beam. The sample welded at a pulse rate of 1 Hz (2 Hz in the middle section) did not show any thermal effects on the anode coil separator.

A subsequent experiment was performed using the welding process shown in FIG. 6B. A thermocouple was placed within the cavity of the battery housing near the location indicated by arrow 118 in FIG. 6B to monitor the peak temperature. In addition to using two segments, as shown in FIG. 6B, experiments were performed in which pulse welded portion 118 was divided into three segments and five segments. As shown in Table 9, the frequency per segment was also manipulated. The pulse width for each of the pulsed welded samples was 10 ms. Additionally, two samples were welded using continuous wave welding at a high power (524 W) and lower power (475 W) to compare temperatures.

TABLE 9

| Peak Power (W) | Segments | Frequency Per Segment (Hz) | Peak Temp. (°C.) |
|---|---|---|---|
| 581 | 2 | 1.00 | 87.4 |
| 581 | 2 | 3.03 | 146 |
| 581 | 2 | 5.00 | 202 |
| 581 | 2 | 3.03 | 146 |
| 581 | 3 | 1.00 | 90.2 |
| 581 | 3 | 3.03 | 152 |
| 581 | 3 | 5.05 | 221 |
| 581 | 5 | 1.00 | 98 |
| 581 | 5 | 3.03 | 175 |
| 524 | CW Welding | | 324.8 |
| 475 | CW Welding | | 290.2 |

The peak pulse power used for the pulsed welding (581 W) was known to cause thermal effects on the anode separator material at a pulse frequency of 5 Hz per segment. As shown in the table, 5 Hz per segment results in a peak temperature of about 200° C. Thus, parameters producing a peak temperature less than 200° C. are candidates for use. To identify potential candidates for use, samples of battery housings enclosing worst-case A-configuration coils were welded and inspected. The pulsed welding parameters are shown below in Table 10. Each sample was pulsed welded at a peak pulse power of 55% of Imax (about 581 W), with a pulse width of about 10 ms. The thermal score was determined based on the scale set forth in Table 2.

TABLE 10

| Sample | Segments | Frequency Per Segment (Hz) | Cycle Time | Thermal Score |
|---|---|---|---|---|
| 1 | 2 | 1.00 | 1.55 min | 1 |
| 2 | 2 | 3.03 | 0.417 min | 1 |
| 3 | 2 | 5.00 | 0.24 min | 5 |
| 4 | 2 | 3.03 | 0.417 min | 3 |
| 5 | 2 | 2.00 | 1.009 min | 1 |
| 6 | 2 | 2.00 | 1.009 min | 1 |
| 7 | 2 | 3.03 | 0.417 min | 3 |
| 8 | 3 | 3.03 | 32 s | 5 |
| 9 | 5 | 3.03 | 20.5 s | 5 |

The data shown in Table 10 indicates a pulse rate of 2.00 Hz per segment combines the lowest thermal score (1.0) and a low cycle time.

Various examples have been described. These and other examples are within the scope of the following claims.

The invention claimed is:

1. A battery for an implantable medical device, the battery comprising:
a first member;
a second member;
a separator material disposed within a cavity defined by the first member and the second member; and
a composite seam weld formed between the first member and the second member, wherein the composite seam weld comprises:
a continuous wave (CW)-welded portion formed using CW welding, and
a pulse-welded portion formed using pulsed welding, wherein the pulse-welded portion is formed closer to the separator material than the CW-welded portion, wherein a first end of the pulse-welded portion partially overlaps a first end of the CW-welded portion and is offset from the first end of the CW-welded portion in a direction substantially perpendicular to a longitudinal orientation of the first end of the CW-welded portion.

2. The battery of claim 1, wherein the composite seam weld forms a hermetic seal between the first member and the second member.

3. The battery of claim 1, wherein the CW-welded portion comprises a first section and a second section, and wherein the first section at least partially overlaps the second section.

4. The battery of claim 3, wherein the first section at least partially overlaps the second section at a location along the composite seam weld that is substantially opposite from the separator material.

5. The battery of claim 1, wherein the separator material comprises an anode separator material.

6. The battery of claim 1, further comprising a first protective insulation disposed in the cavity defined by the first member and the second member, wherein the protective insulation is disposed between the separator material and the first end of the CW-welded portion.

7. The battery of claim 1, wherein a second end of the pulse-welded portion partially overlaps a second end of the CW-welded portion and is offset from the second end of the CW-welded portion in a direction substantially perpendicular to a longitudinal orientation of the second end of the CW-welded portion.

8. The battery of claim 7, further comprising a first protective insulation disposed in the cavity defined by the first member and the second member and a second protective insulation disposed in the cavity defined by the first member and the second member, wherein the first protective insulation is disposed between the separator material and the first end of the CW-welded portion, and wherein the second protective insulation is disposed between the thermally sensitive module and the second end of the CW-welded portion.

9. The battery of claim 1, wherein the first member comprises a battery case and the second member comprises a battery cover.

10. A component of an implantable medical device, the component comprising:
a first member;
a second member;
a thermally sensitive module disposed within a cavity defined by the first member and the second member, wherein the thermally sensitive module is a separator material, a polymer material, a hybrid circuit or an integrated circuit; and
a composite seam weld formed between the first member and the second member, wherein the composite seam weld comprises:
a continuous wave (CW)-welded portion formed using CW welding, and
a pulse-welded portion formed using pulsed welding, wherein a first end of the pulse-welded portion partially overlaps a first end of the CW-welded portion and is offset from the first end of the CW-welded portion in a direction substantially perpendicular to a longitudinal orientation of the first end of the CW-welded portion, wherein the pulse-welded portion is formed closer to the thermally sensitive module than the CW-welded portion.

11. The component of claim 10, wherein the CW-welded portion comprises a first section and a second section, and wherein the first section at least partially overlaps the second section.

12. The component of claim 11, wherein the first section at least partially overlaps the second section at a location along the composite seam weld that is substantially opposite from the thermally sensitive module.

13. The component of claim 10, wherein the composite seam weld forms a hermetic seal between the first member and the second member.

14. The component of claim 10, further comprising a first protective insulation disposed in the cavity defined by the first member and the second member, wherein the protective insulation is disposed between the thermally sensitive module and the first end of the CW-welded portion.

15. The component of claim 10, wherein a second end of the pulse-welded portion partially overlaps a second end of the CW-welded portion and is offset from the second end of the CW-welded portion in a direction substantially perpendicular to a longitudinal orientation of the second end of the CW-welded portion.

16. The component of claim 10, further comprising a first protective insulation disposed in the cavity defined by the first member and the second member and a second protective insulation disposed in the cavity defined by the first member and the second member, wherein the first protective insulation is disposed between the thermally sensitive module and the first end of the CW-welded portion, and wherein the second protective insulation is disposed between the thermally sensitive module and the second end of the CW-welded portion.

17. The component of claim 10, wherein the first member comprises a battery case and the second member comprises a battery cover.

18. The component of claim 10, wherein the component comprises a housing of the implantable medical device.

19. The component of claim 10, wherein the component comprises a housing of a capacitor.

20. The component of claim 10, wherein the component comprises a package of an integrated or hybrid circuit.

* * * * *